(12) United States Patent
Chatlani et al.

(10) Patent No.: US 10,937,418 B1
(45) Date of Patent: Mar. 2, 2021

(54) ECHO CANCELLATION BY ACOUSTIC PLAYBACK ESTIMATION

(71) Applicant: Amazon Technologies, Inc., Seattle, WA (US)

(72) Inventors: Navin Chatlani, Palo Alto, CA (US); Krishna Kamath Koteshwara, Santa Clara, CA (US); Trausti Thor Kristjansson, San Jose, CA (US); Inseok Heo, Fairfax, VA (US); Robert Ayrapetian, Morgan Hill, CA (US)

(73) Assignee: Amazon Technologies, Inc., Seattle, WA (US)

( * ) Notice: Subject to any disclaimer, the term of this patent is extended or adjusted under 35 U.S.C. 154(b) by 82 days.

(21) Appl. No.: 16/240,294

(22) Filed: Jan. 4, 2019

(51) Int. Cl.
*G10L 15/20* (2006.01)
*G10L 21/0232* (2013.01)
*G10L 15/22* (2006.01)
G10L 21/0208 (2013.01)

(52) U.S. Cl.
CPC .............. *G10L 15/20* (2013.01); *G10L 15/22* (2013.01); *G10L 21/0232* (2013.01); G10L 2015/223 (2013.01); G10L 2021/02082 (2013.01)

(58) Field of Classification Search
CPC .................. G01S 3/805; G10K 11/178; G10K 11/17885; G10K 11/1782; G10K 11/17854; G10L 15/20; G10L 15/22; G10L 21/0232; G10L 21/0388; G10L 2015/223; G10L 2021/02082; G10L 15/08; G10L 15/285; G10L 21/02; G10L 21/028; G10L 21/0308; G10L 25/78; H04L 1/1825; H04L 43/0829; H04L 65/4053; H04L 65/608; H04R 29/004; H04R 3/005; G06F 3/165; H04W 64/00
USPC ........ 379/406.08, 406.01; 381/18, 66, 73, 1, 381/92, 73.1; 700/94; 704/205, 226, 704/233, 273; 370/252
See application file for complete search history.

(56) References Cited

U.S. PATENT DOCUMENTS

| | | | | |
|---|---|---|---|---|
| 4,670,903 | A * | 6/1987 | Araseki | .................... H04B 3/23 379/406.08 |
| 8,364,491 | B2 * | 1/2013 | Topchy | .................. H04H 20/14 704/273 |
| 9,131,016 | B2 * | 9/2015 | Glueckman | ......... H04L 65/1059 |
| 9,373,320 | B1 * | 6/2016 | Lyon | ................... G10L 21/0308 |
| 9,704,471 | B1 * | 7/2017 | Ku | ........................... F01N 1/065 |

(Continued)

*Primary Examiner* — Gerald Gauthier
(74) *Attorney, Agent, or Firm* — Pierce Atwood LLP

(57) ABSTRACT

A system configured to improve echo cancellation for non-linear systems. The system generate reference audio data by isolating portions of microphone audio data that correspond to playback audio data. For example, the system may determine a correlation between the playback audio data and the microphone audio data in individual time-frequency bands in a frequency domain. In some examples, the system may substitute microphone audio data associated with output audio for the playback audio data. The system may generate the reference audio data based on portions of the microphone audio data that have a strong correlation with the playback audio data. The system may generate the reference audio data by selecting these portions of the microphone audio data or by performing beamforming. This results in precise time alignment between the reference audio data and the microphone audio data, improving performance of the echo cancellation.

18 Claims, 25 Drawing Sheets

(56) References Cited

U.S. PATENT DOCUMENTS

| | | | | |
|---|---|---|---|---|
| 10,152,961 B2* | 12/2018 | Tsuchiya | G10K 11/178 | |
| 10,649,727 B1* | 5/2020 | Douglas | G10L 15/22 | |
| 10,735,597 B1* | 8/2020 | Zagorski | H04L 65/1069 | |
| 10,755,727 B1* | 8/2020 | Chu | G10L 21/0232 | |
| 2005/0271215 A1* | 12/2005 | Kulkarni | H04S 5/00 | 381/18 |
| 2006/0034448 A1* | 2/2006 | Parry | H04M 9/082 | 379/406.01 |
| 2008/0151769 A1* | 6/2008 | El-Hennawey | H04L 65/80 | 370/252 |
| 2009/0112580 A1* | 4/2009 | Hirabayashi | G10L 13/07 | 704/205 |
| 2009/0214050 A1* | 8/2009 | Sawashi | H04R 3/04 | 381/73.1 |
| 2010/0185308 A1* | 7/2010 | Yoshida | H04S 7/00 | 700/94 |
| 2010/0303254 A1* | 12/2010 | Yoshizawa | G01S 3/8083 | 381/92 |
| 2011/0093262 A1* | 4/2011 | Wittke | G10K 11/178 | 704/226 |
| 2013/0188799 A1* | 7/2013 | Otani | H04R 3/002 | 381/66 |
| 2014/0328490 A1* | 11/2014 | Mohammad | H04R 3/002 | 381/66 |
| 2015/0235651 A1* | 8/2015 | Sharifi | G10L 15/222 | 704/233 |
| 2017/0278525 A1* | 9/2017 | Wang | G10L 15/20 | |
| 2017/0287501 A1* | 10/2017 | Matsumoto | G10L 21/028 | |
| 2018/0247635 A1* | 8/2018 | Yuzuriha | H04R 29/004 | |
| 2018/0330747 A1* | 11/2018 | Ebenezer | G10L 25/84 | |
| 2018/0349086 A1* | 12/2018 | Chakra | H04W 64/00 | |
| 2019/0052957 A1* | 2/2019 | Zernicki | H04R 19/04 | |
| 2019/0096384 A1* | 3/2019 | Sereshki | H04B 17/336 | |
| 2019/0104079 A1* | 4/2019 | Wang | H04L 1/205 | |
| 2019/0115043 A1* | 4/2019 | Ikeshita | G10L 21/0388 | |
| 2020/0202882 A1* | 6/2020 | Baker | G10L 25/51 | |
| 2020/0302923 A1* | 9/2020 | Ni | G10L 15/30 | |

\* cited by examiner

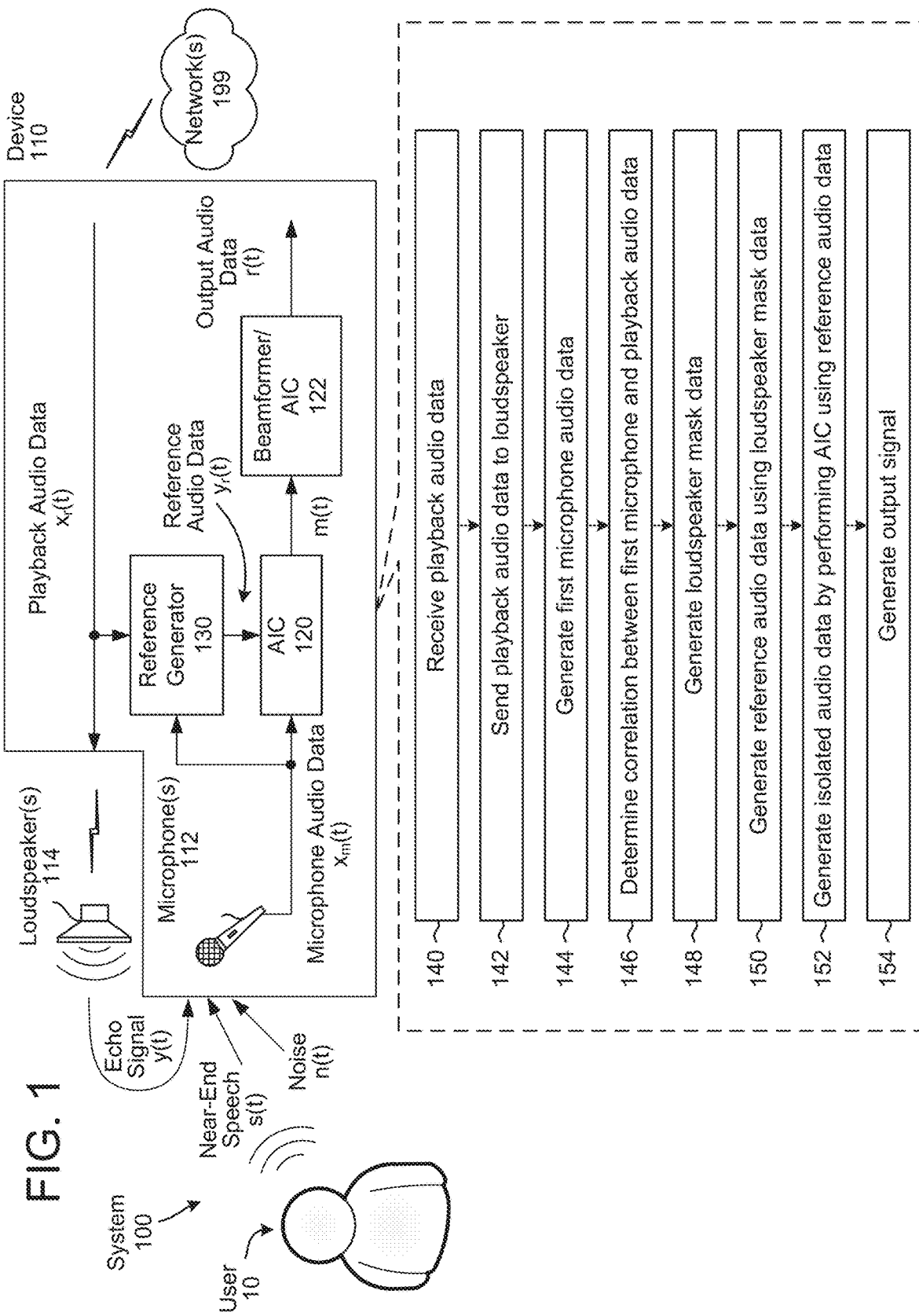

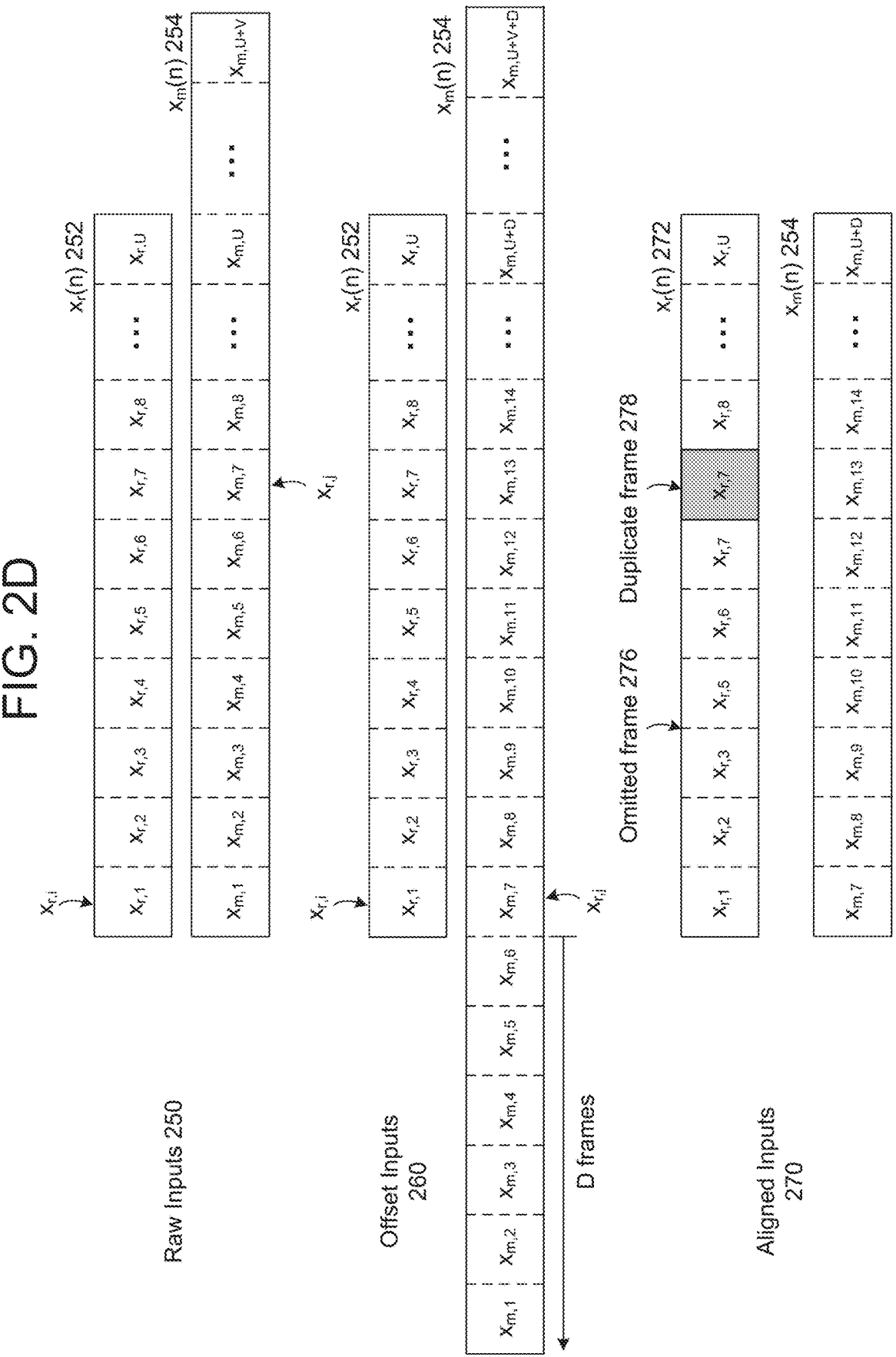

FIG. 5A  Dynamic Reference Beam Selection During Far-End Single-Talk
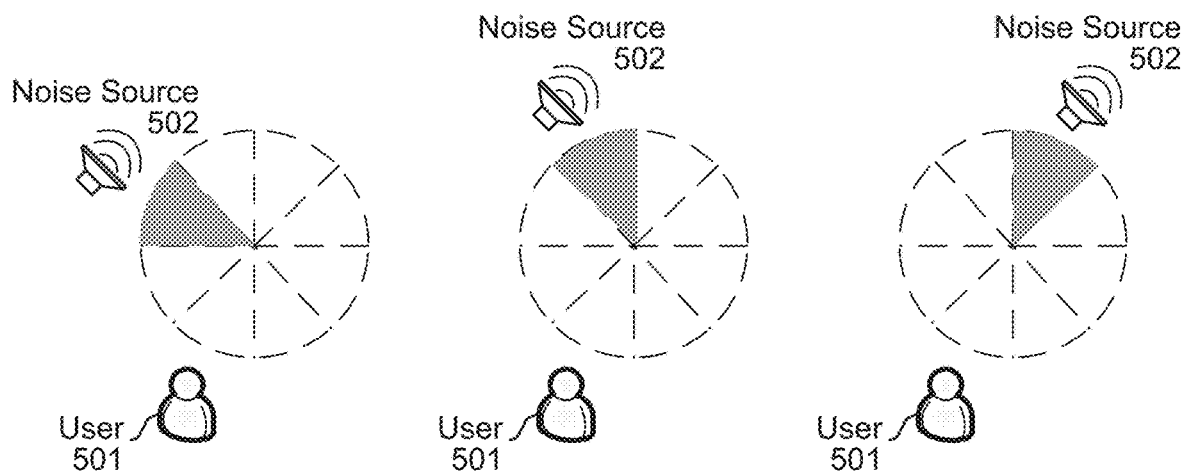
FIG. 5B  Dynamic Reference Beam Selection During Near-End Single-Talk
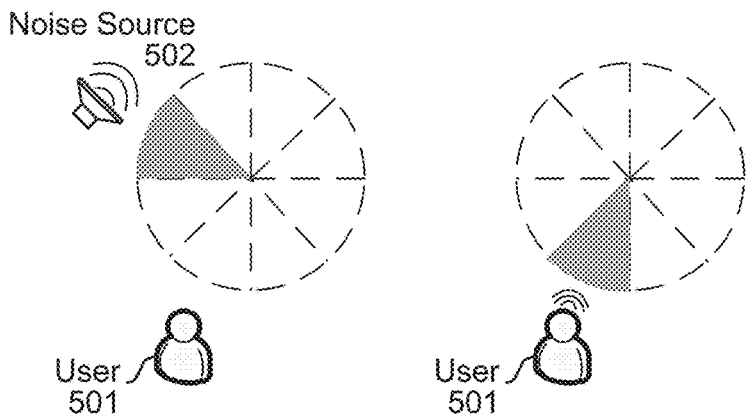
FIG. 5C  Freezing Reference Beam Selection During Near-End Single-Talk
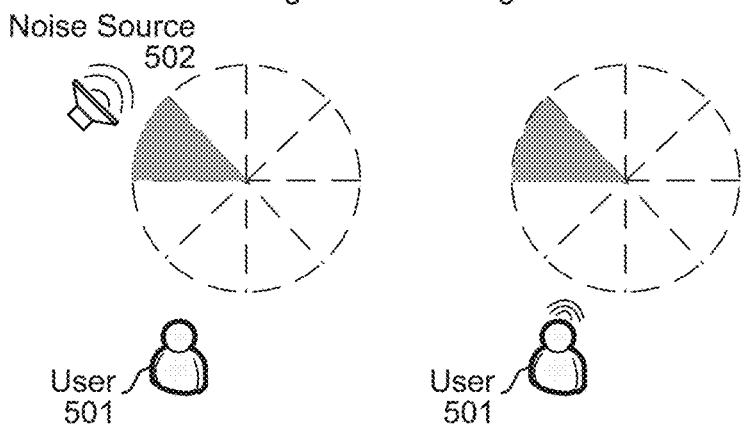

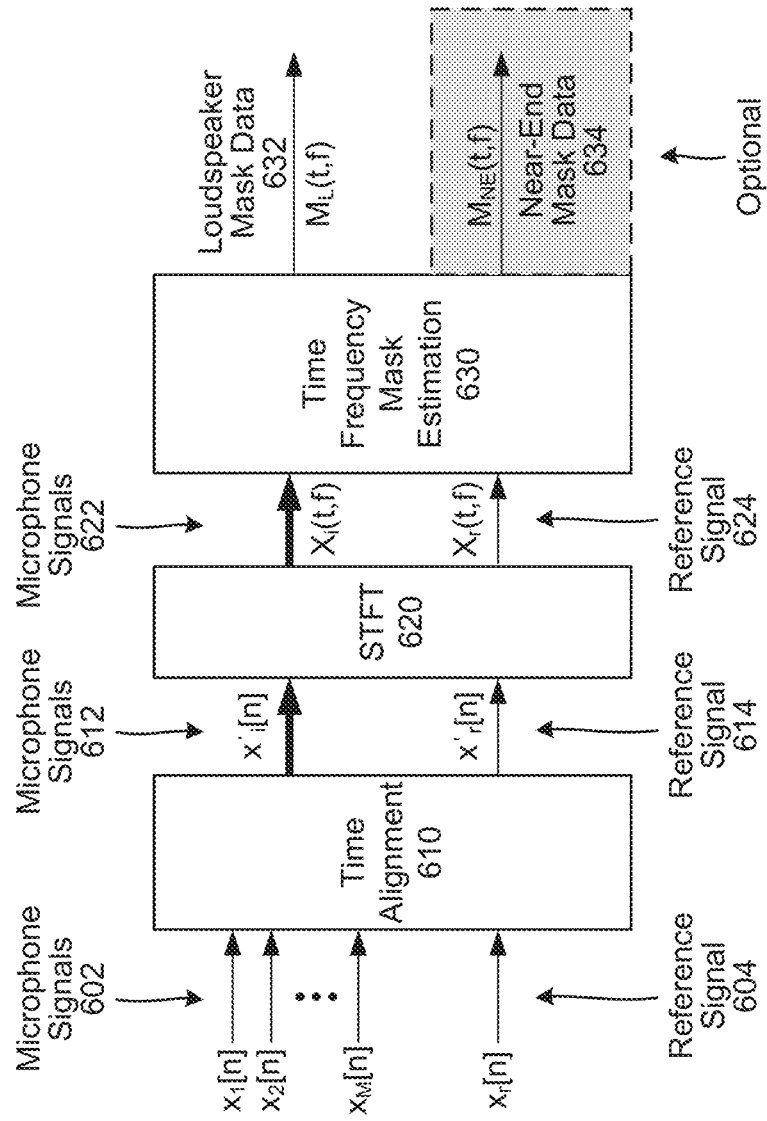

Loudspeaker Mask Data 730

Near-End Mask Data 732

Loudspeaker Mask Data 740

Near-End Mask Data 742

Unselected Mask Data 744

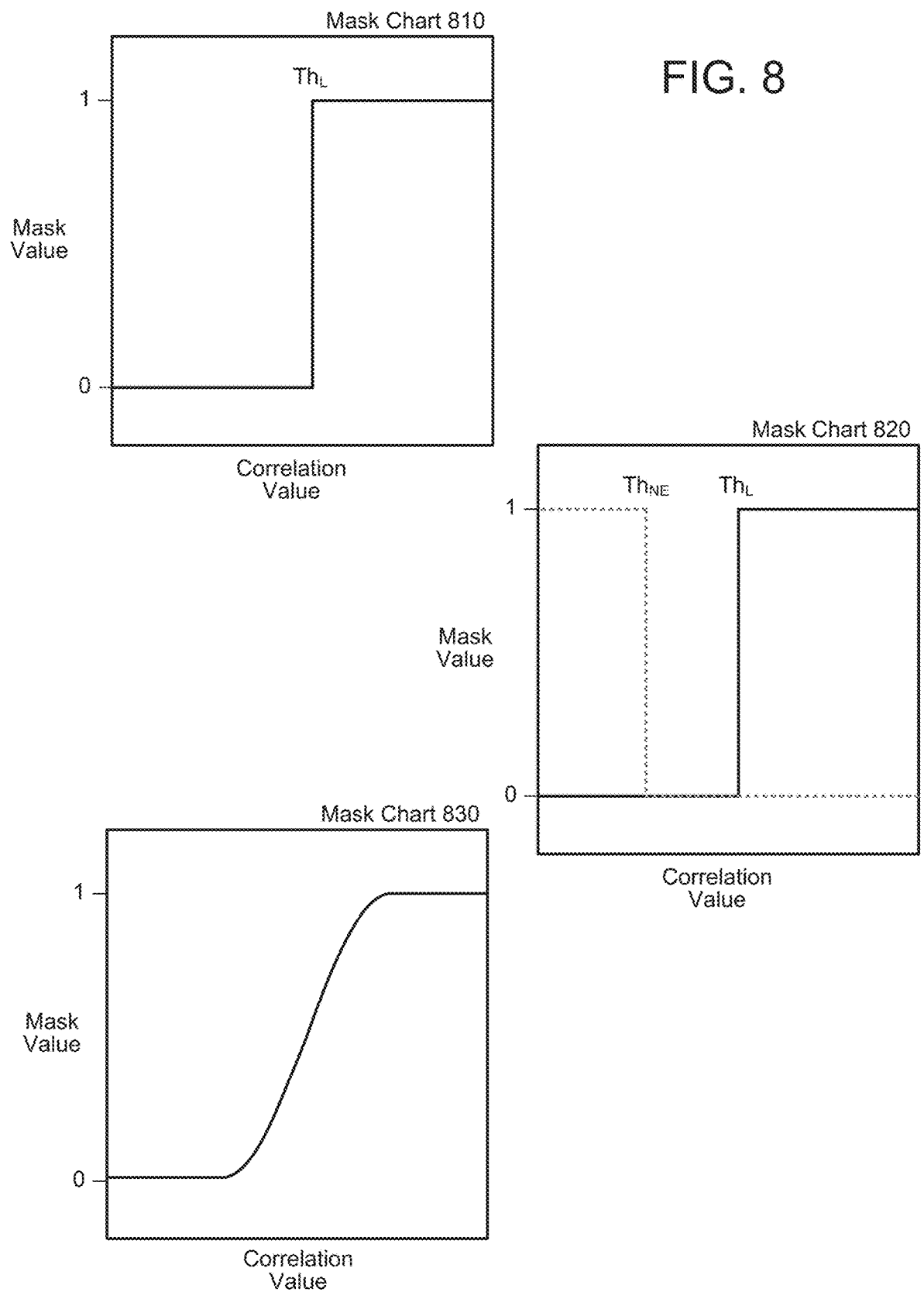

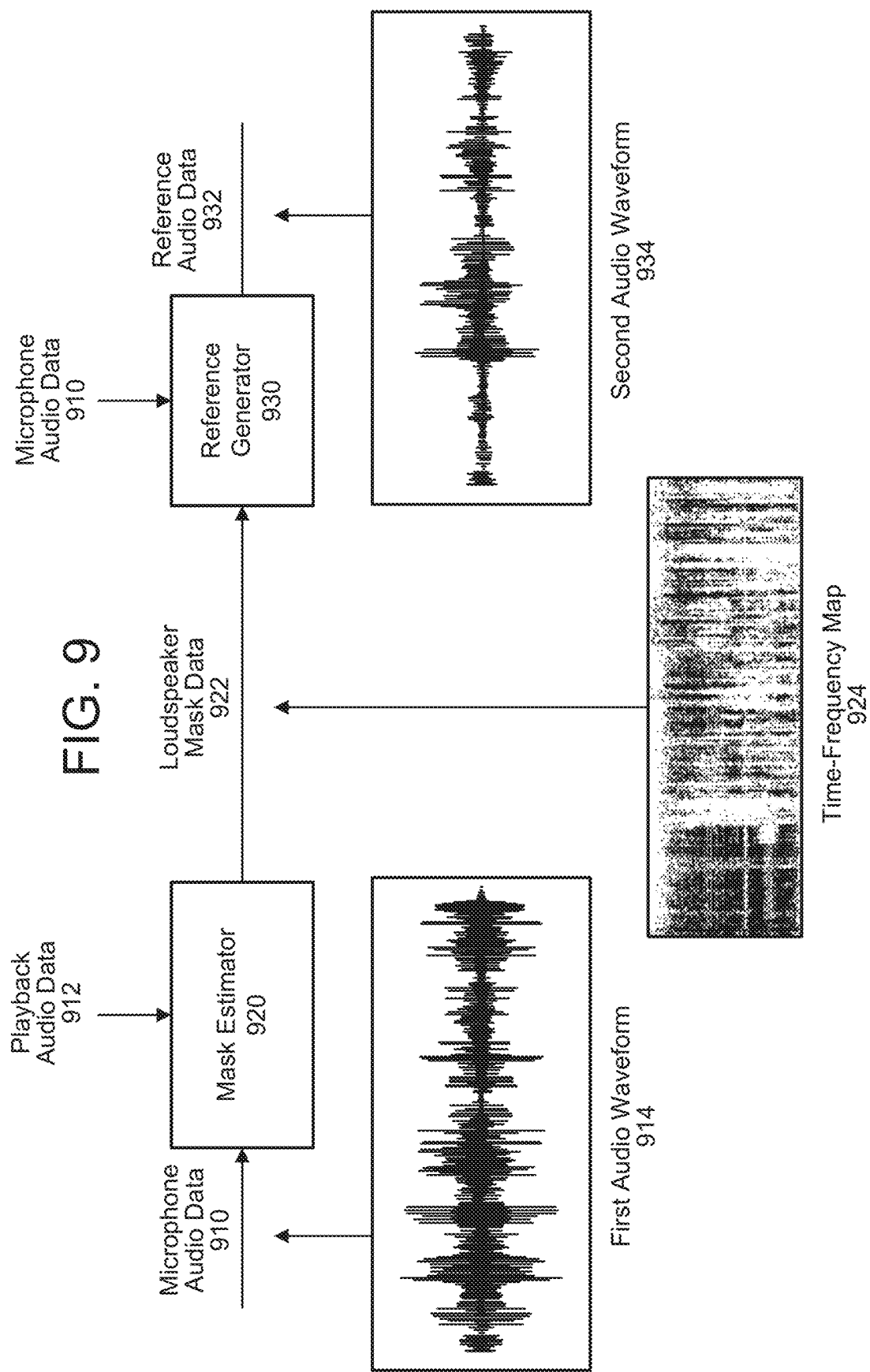

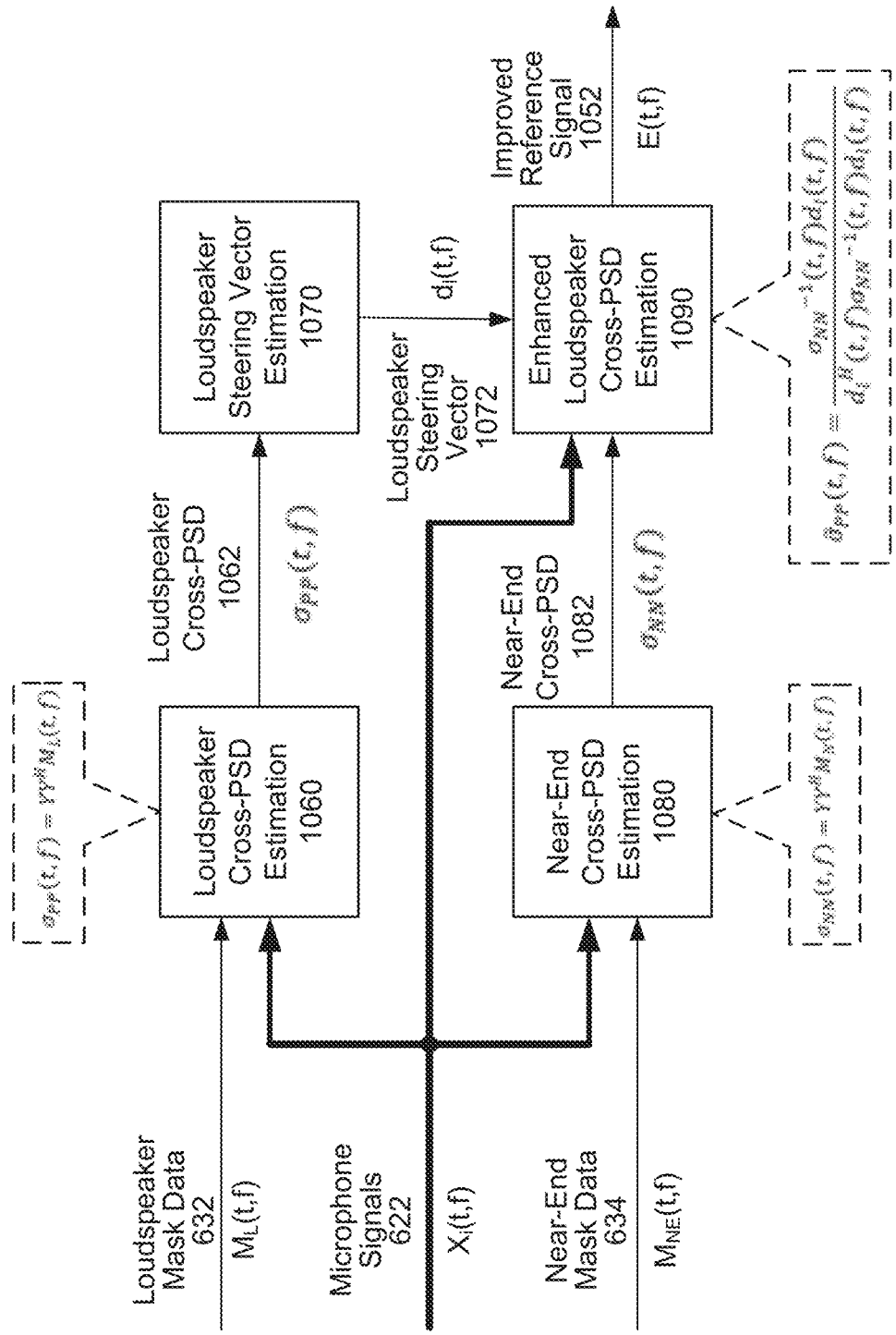

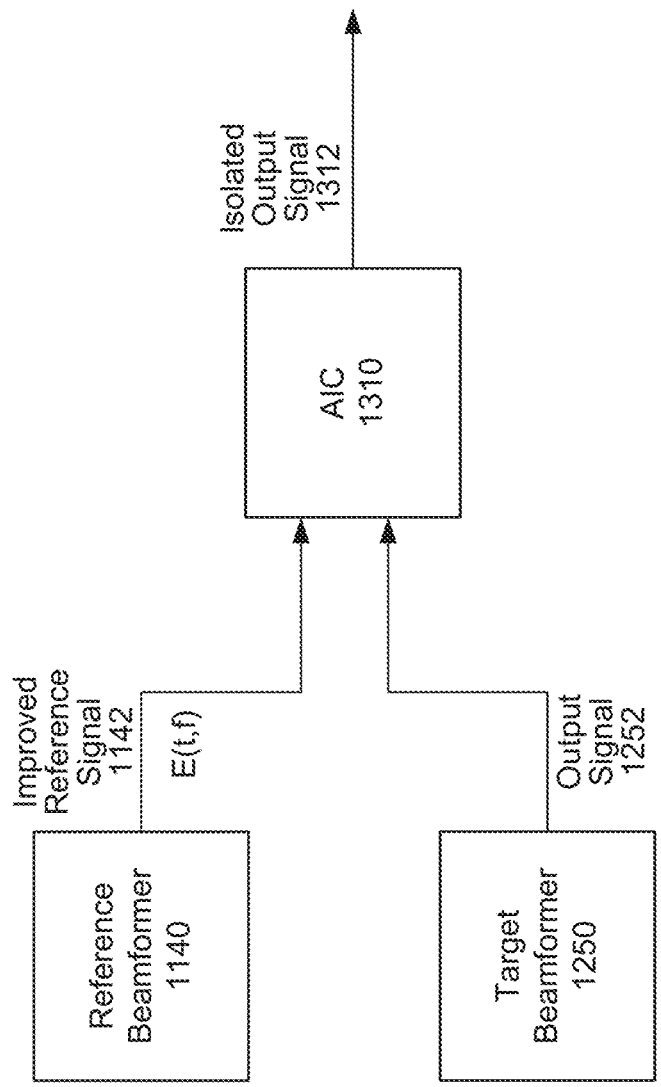

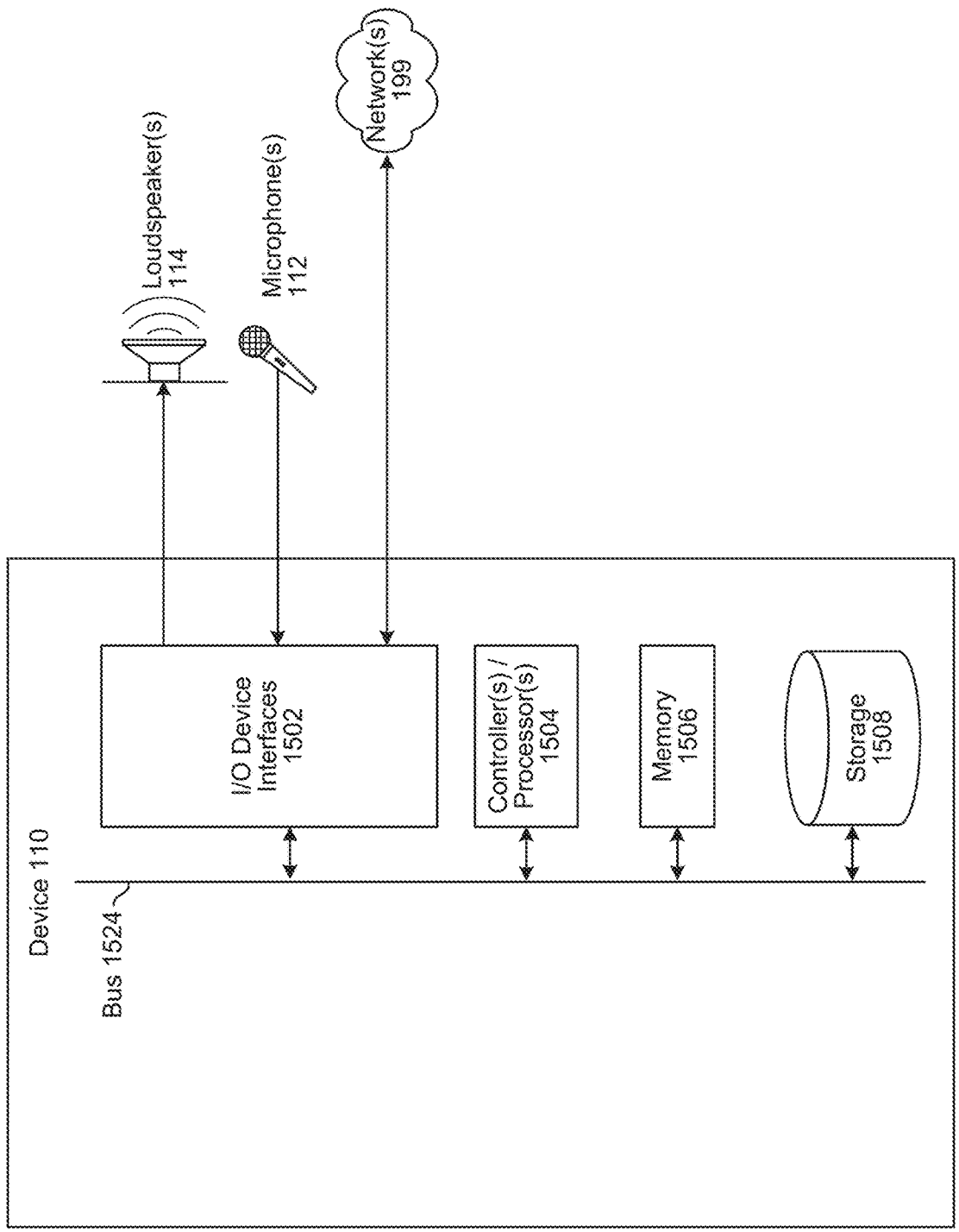

ECHO CANCELLATION BY ACOUSTIC PLAYBACK ESTIMATION

BACKGROUND

With the advancement of technology, the use and popularity of electronic devices has increased considerably. Electronic devices are commonly used to capture and process audio data.

BRIEF DESCRIPTION OF DRAWINGS

For a more complete understanding of the present disclosure, reference is now made to the following description taken in conjunction with the accompanying drawings.

FIG. 1 illustrates a system according to embodiments of the present disclosure.

FIGS. 2A-2D illustrate examples of frame indexes, tone indexes, channel indexes, and performing time alignment.

FIGS. 5A-5C illustrate dynamic and fixed reference beam selection according to embodiments of the present disclosure.

FIG. 6 illustrates an example of generating mask data according to examples of the present disclosure.

FIG. 8 illustrates a first example of binary gain values, a second example of multiple threshold values, and a third example of continuous gain values according to examples of the present disclosure.

FIG. 9 illustrates an example of generating audio data using mask data according to examples of the present disclosure.

FIGS. 10A-10C illustrate example of generating isolated audio data using mask data according to examples of the present disclosure.

FIG. 13 illustrates an example of performing adaptive interference cancellation using output signals generated by the beamformer according to examples of the present disclosure.

FIG. 15 is a block diagram conceptually illustrating example components of a system according to embodiments of the present disclosure.

DETAILED DESCRIPTION

Figure 2A:
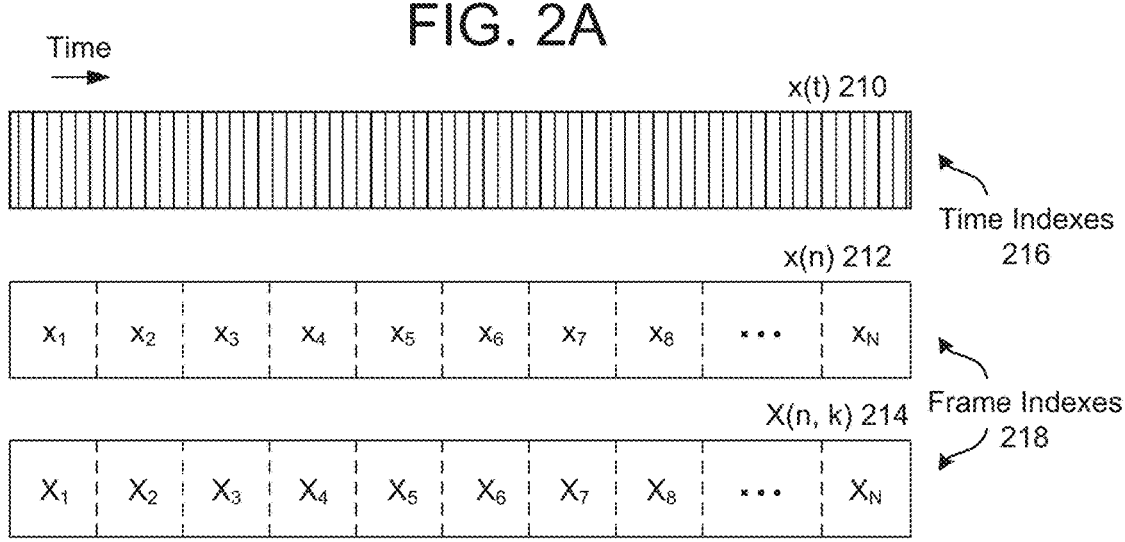

Electronic devices may be used to capture and process audio data. The audio data may be used for voice commands and/or may be output by loudspeakers as part of a communication session. During a communication session, loudspeakers may generate audio using playback audio data while a microphone generates local audio data. An electronic device may perform audio processing, such as acoustic echo cancellation (AEC), residual echo suppression, and/or the like, to remove an "echo" signal corresponding to the playback audio data from the local audio data, isolating local speech to be used for voice commands and/or the communication session.

When the playback audio data is sent to the loudspeakers using a wireless connection and/or other nonlinearities are present, performing AEC processing using the playback audio data results in distortion and other signal degradation. This distortion is caused by imprecise time alignment between the playback audio data and the local audio data, which may be caused by variable delays, dropped packets, clock jitter, clock skew, and/or the like.

To improve echo cancellation, devices, systems and methods are disclosed that generate reference audio data by isolating portions of microphone audio data that correspond to playback audio data. For example, a device may determine a correlation between the playback audio data and the microphone audio data in individual time-frequency bands in a frequency domain. First portions of the microphone audio data that have a strong correlation with the playback audio data are included in the reference audio data, while second portions of the microphone audio data that have a weak correlation with the playback audio data are discarded. Additionally or alternatively, the device may perform beamforming to generate the reference audio data, using the second portions of the microphone audio data as "noise." Generating the reference audio data based on the microphone audio data results in precise time alignment between the reference audio data and the microphone audio data, improving a performance of the echo cancellation. In some examples, the system may substitute microphone audio data associated with output audio for the playback audio data. For example, output from a particular microphone associated with the output audio and/or beamformed audio data corresponding to a direction of the output audio may be used instead of the playback audio data.

FIG. 1 illustrates a high-level conceptual block diagram of a system 100 configured to perform acoustic echo cancellation in a nonlinear system. Although FIG. 1, and other figures/discussion illustrate the operation of the system in a particular order, the steps described may be performed in a different order (as well as certain steps removed or added) without departing from the intent of the disclosure. As illustrated in FIG. 1, the system 100 may include a device 110 that may be communicatively coupled to network(s) 199 and may include one or more microphone(s) 112 in a microphone array and/or one or more loudspeaker(s) 114. However, the disclosure is not limited thereto and the device 110 may include additional components without departing from the disclosure. To emphasize that the system 100 is beneficial when variable delays and other nonlinearities are present, FIG. 1 illustrates the one or more loudspeaker(s) 114 as being external to the device 110 and connected to the device 110 wirelessly. However, the disclosure is not limited thereto and the loudspeaker(s) 114 may be included in the device 110 and/or connected via a wired connection without departing from the disclosure.

The device 110 may be an electronic device configured to send audio data to and/or receive audio data. For example, the device 110 (e.g., local device) may receive playback audio data $x_r(t)$ (e.g., far-end reference audio data) from a remote device and the playback audio data $x_r(t)$ may include remote speech originating at the remote device. During a communication session, the device 110 may generate output audio corresponding to the playback audio data $x_r(t)$ using the one or more loudspeaker(s) 114. While generating the output audio, the device 110 may capture a microphone audio data $x_m(t)$ (e.g., input audio data) using the one or more microphone(s) 112. In addition to capturing desired speech (e.g., the microphone audio data includes a representation of local speech from a user 10), the device 110 may capture a portion of the output audio generated by the loudspeaker(s) 114 (including a portion of the remote speech), which may be referred to as an "echo" or echo signal, along with additional acoustic noise (e.g., undesired speech, ambient acoustic noise in an environment around the device 110, etc.), as discussed in greater detail below.

For ease of illustration, the disclosure may refer to audio data and/or an audio signal. For example, some audio data may be referred to as playback audio data $x_r(t)$, microphone audio data $x_m(t)$, error audio data $m(t)$, output audio data $r(t)$, and/or the like. Additionally or alternatively, this audio data may be referred to as audio signals such as a playback signal $x_r(t)$, microphone signal $x_m(t)$, error signal $m(t)$, output audio data $r(t)$, and/or the like without departing from the disclosure.

In some examples, the device 110 may send the microphone audio data $x_m(t)$ to the remote device as part of a Voice over Internet Protocol (VoIP) communication session. For example, the device 110 may send the microphone audio data $x_m(t)$ to the remote device either directly or via remote server(s) and may receive the playback audio data $x_r(t)$ from the remote device either directly or via the remote server(s). However, the disclosure is not limited thereto and in some examples, the device 110 may send the microphone audio data $x_m(t)$ to the remote server(s) in order for the remote server(s) to determine a voice command. For example, during a communication session the device 110 may receive the playback audio data $x_r(t)$ from the remote device and may generate the output audio based on the playback audio data $x_r(t)$. However, the microphone audio data $x_m(t)$ may be separate from the communication session and may include a voice command directed to the remote server(s). Therefore, the device 110 may send the microphone audio data $x_m(t)$ to the remote server(s) and the remote server(s) may determine a voice command represented in the microphone audio data $x_m(t)$ and may perform an action corresponding to the voice command (e.g., execute a command, send an instruction to the device 110 and/or other devices to execute the command, etc.). In some examples, to determine the voice command the remote server(s) may perform Automatic Speech Recognition (ASR) processing, Natural Language Understanding (NLU) processing and/or command processing. The voice commands may control the device 110, audio devices (e.g., play music over loudspeaker(s) 114, capture audio using microphone(s) 112, or the like), multimedia devices (e.g., play videos using a display, such as a television, computer, tablet or the like), smart home devices (e.g., change temperature controls, turn on/off lights, lock/unlock doors, etc.) or the like.

Prior to sending the microphone audio data $x_m(t)$ to the remote device/remote server(s), the device 110 may perform acoustic echo cancellation (AEC), adaptive interference cancellation (AIC), residual echo suppression (RES), and/or other audio processing to isolate local speech captured by the microphone(s) 112 and/or to suppress unwanted audio data (e.g., echoes and/or noise). As illustrated in FIG. 1, the device 110 may receive the playback audio data $x_r(t)$ and may generate playback audio (e.g., echo signal $y(t)$) using the loudspeaker(s) 114. The playback audio data $x_r(t)$ may be referred to as playback audio data, a playback signal, a far-end reference signal, far-end reference audio data, and/or the like. The one or more microphone(s) 112 in the microphone array may capture microphone audio data $x_m(t)$, which may be referred to as microphone audio data, a microphone signal, a near-end reference signal, near-end audio data, input audio data, and/or the like, which may include the echo signal $y(t)$ along with near-end speech $s(t)$ from the user 10 and noise $n(t)$.

In audio systems, acoustic echo cancellation (AEC) processing refers to techniques that are used to recognize when a device has recaptured sound via microphone(s) after some delay that the device previously output via loudspeaker(s). The device may perform AEC processing by subtracting a delayed version of the original audio signal (e.g., playback audio data $x_r(t)$) from the captured audio (e.g., microphone audio data $x_m(t)$), producing a version of the captured audio that ideally eliminates the "echo" of the original audio signal, leaving only new audio information. For example, if someone were singing karaoke into a microphone while prerecorded music is output by a loudspeaker, AEC processing can be used to remove any of the recorded music from the audio captured by the microphone, allowing the singer's voice to be amplified and output without also reproducing a delayed "echo" of the original music. As another example, a media player that accepts voice commands via a microphone can use AEC processing to remove reproduced sounds corresponding to output media that are captured by the microphone, making it easier to process input voice commands.

When the playback audio data $x_r(t)$ is sent to the loudspeaker(s) 114 using a wireless connection and/or other nonlinearities are present in the system 100, performing AEC using the delayed playback audio data $x_r(t)$ results in distortion and other signal degradation. This distortion is caused by imprecise time alignment between the delayed playback audio data $x_r(t)$ and the microphone audio data $x_m(t)$, which may be caused by variable delays, dropped packets, clock jitter, clock skew, and/or the like.

To improve echo cancellation, the device 110 includes a reference generator 130 that is configured to generate reference audio data $y_r(t)$ based on the microphone audio data $x_m(t)$, which results in precise time alignment between the reference audio data $y_r(t)$ and the microphone audio data $x_m(t)$. For example, the reference generator 130 may determine a correlation between the playback audio data $x_r(t)$ and the microphone audio data $x_m(t)$ in individual time-frequency bands in the frequency domain. When the reference generator 130 determines that there is a strong correlation (e.g., correlation value exceeds a threshold), the reference generator 130 may associate the time-frequency band with the reference signal. When the reference generator 130 determines that there is a weak correlation (e.g., correlation value is below the threshold), the reference generator 130 may associate the time-frequency band with near-end signals. As will be described in greater detail below, the reference generator 130 may generate loudspeaker mask data indicating the time-frequency bands that are associated with the reference signal. To generate the reference audio data $y_r(t)$, the reference generator 130 may apply the loudspeaker mask data to the microphone audio data $x_m(t)$ to select only portions of the microphone audio data $x_m(t)$ that correspond to the playback audio data $x_r(t)$.

To isolate the local speech (e.g., near-end speech $s(t)$) from the user 10), the device 110 may include an AIC component 120 that subtracts the reference audio data $y_r(t)$ from the microphone audio data $x_m(t)$ to generate an error signal $m(t)$.

Thus, the output of the AIC component 120 (e.g., error signal m(t)) may include the near-end speech s(t) along with portions of the echo signal y(t) and/or the noise n(t) (e.g., difference between the reference audio data $y_r(t)$ and the actual echo signal y(t) and noise n(t)). The device 110 may include a beamformer/AIC component 122 that performs additional audio processing on the error signal m(t) to generate output audio data r(t), as discussed below with regard to FIGS. 10A-12C.

For ease of illustration, FIG. 1 illustrates the playback audio data $x_r(t)$, the microphone audio data $x_m(t)$, and the reference audio data $y_r(t)$ as audio signals in the time-domain. As will be described in greater detail below, the device 110 may convert these signals to the frequency-domain or subband-domain in order to generate the reference audio data, perform AEC, AIC, and/or the like.

As illustrated in FIG. 1, the device 110 may receive (140) playback audio data and may send (142) the playback audio data to the loudspeaker(s) 114. The device 110 may generate (144) first microphone audio data using at least one microphone 112, may determine (146) a correlation between the first microphone audio data and the playback audio data, and may generate (148) loudspeaker mask data. The device 110 may generate (150) reference audio data using the loudspeaker mask data and the first microphone audio data, may generate (152) isolated audio data by performing adaptive interference cancellation (AIC) using the reference audio data, and may generate output audio data by performing additional audio processing (e.g., using the beamformer/AIC component 122).

The device 110 may operate microphone(s) 112, where beamforming techniques may be used to isolate desired audio including speech. In audio systems, beamforming refers to techniques that are used to isolate audio from a particular direction in a multi-directional audio capture system. Beamforming may be particularly useful when filtering out noise from non-desired directions. Beamforming may be used for various tasks, including isolating voice commands to be executed by a speech-processing system.

One technique for beamforming involves boosting audio received from a desired direction while dampening audio received from a non-desired direction. In one example of a beamformer system, a fixed beamformer unit employs a filter-and-sum structure to boost an audio signal that originates from the desired direction (sometimes referred to as the look-direction) while largely attenuating audio signals that original from other directions. A fixed beamformer unit may effectively eliminate certain diffuse noise (e.g., undesireable audio), which is detectable in similar energies from various directions, but may be less effective in eliminating noise emanating from a single source in a particular non-desired direction. The beamformer unit may also incorporate an adaptive beamformer unit/noise canceller that can adaptively cancel noise from different directions depending on audio conditions.

In addition to or as an alternative to generating the reference signal based on the playback audio data, Adaptive Reference Algorithm (ARA) processing may generate an adaptive reference signal based on the input audio data. To illustrate an example, the ARA processing may perform beamforming using the input audio data to generate a plurality of audio signals (e.g., beamformed audio data) corresponding to particular directions. For example, the plurality of audio signals may include a first audio signal corresponding to a first direction, a second audio signal corresponding to a second direction, a third audio signal corresponding to a third direction, and so on. The ARA processing may select the first audio signal as a target signal (e.g., the first audio signal includes a representation of speech) and the second audio signal as a reference signal (e.g., the second audio signal includes a representation of the echo and/or other acoustic noise) and may perform Adaptive Interference Cancellation (AIC) (e.g., adaptive acoustic interference cancellation) by removing the reference signal from the target signal. As the input audio data is not limited to the echo signal, the ARA processing may remove other acoustic noise represented in the input audio data in addition to removing the echo. Therefore, the ARA processing may be referred to as performing AIC, adaptive noise cancellation (ANC), AEC, and/or the like without departing from the disclosure.

As discussed in greater detail below, the device 110 may include an adaptive beamformer and may be configured to perform AIC using the ARA processing to isolate the speech in the input audio data. The adaptive beamformer may dynamically select target signal(s) and/or reference signal(s). Thus, the target signal(s) and/or the reference signal(s) may be continually changing over time based on speech, acoustic noise(s), ambient noise(s), and/or the like in an environment around the device 110. For example, the adaptive beamformer may select the target signal(s) by detecting speech, based on signal strength values or signal quality metrics (e.g., signal-to-noise ratio (SNR) values, average power values, etc.), and/or using other techniques or inputs, although the disclosure is not limited thereto. As an example of other techniques or inputs, the device 110 may capture video data corresponding to the input audio data, analyze the video data using computer vision processing (e.g., facial recognition, object recognition, or the like) to determine that a user is associated with a first direction, and select the target signal(s) by selecting the first audio signal corresponding to the first direction. Similarly, the adaptive beamformer may identify the reference signal(s) based on the signal strength values and/or using other inputs without departing from the disclosure. Thus, the target signal(s) and/or the reference signal(s) selected by the adaptive beamformer may vary, resulting in different filter coefficient values over time.

As discussed above, the device 110 may perform beamforming (e.g., perform a beamforming operation to generate beamformed audio data corresponding to individual directions). As used herein, beamforming (e.g., performing a beamforming operation) corresponds to generating a plurality of directional audio signals (e.g., beamformed audio data) corresponding to individual directions relative to the microphone array. For example, the beamforming operation may individually filter input audio signals generated by multiple microphones in the microphone array 114 (e.g., first audio data associated with a first microphone, second audio data associated with a second microphone, etc.) in order to separate audio data associated with different directions. Thus, first beamformed audio data corresponds to audio data associated with a first direction, second beamformed audio data corresponds to audio data associated with a second direction, and so on. In some examples, the device 110 may generate the beamformed audio data by boosting an audio signal originating from the desired direction (e.g., look direction) while attenuating audio signals that originate from other directions, although the disclosure is not limited thereto.

To perform the beamforming operation, the device 110 may apply directional calculations to the input audio signals. In some examples, the device 110 may perform the directional calculations by applying filters to the input audio signals using filter coefficients associated with specific directions. For example, the device 110 may perform a first directional calculation by applying first filter coefficients to the input audio signals to generate the first beamformed audio data and may perform a second directional calculation by applying second filter coefficients to the input audio signals to generate the second beamformed audio data.

The filter coefficients used to perform the beamforming operation may be calculated offline (e.g., preconfigured ahead of time) and stored in the device 110. For example, the device 110 may store filter coefficients associated with hundreds of different directional calculations (e.g., hundreds of specific directions) and may select the desired filter coefficients for a particular beamforming operation at runtime (e.g., during the beamforming operation). To illustrate an example, at a first time the device 110 may perform a first beamforming operation to divide input audio data into 36 different portions, with each portion associated with a specific direction (e.g., 10 degrees out of 360 degrees) relative to the device 110. At a second time, however, the device 110 may perform a second beamforming operation to divide input audio data into 6 different portions, with each portion associated with a specific direction (e.g., 60 degrees out of 360 degrees) relative to the device 110.

These directional calculations may sometimes be referred to as "beams" by one of skill in the art, with a first directional calculation (e.g., first filter coefficients) being referred to as a "first beam" corresponding to the first direction, the second directional calculation (e.g., second filter coefficients) being referred to as a "second beam" corresponding to the second direction, and so on. Thus, the device 110 stores hundreds of "beams" (e.g., directional calculations and associated filter coefficients) and uses the "beams" to perform a beamforming operation and generate a plurality of beamformed audio signals. However, "beams" may also refer to the output of the beamforming operation (e.g., plurality of beamformed audio signals). Thus, a first beam may correspond to first beamformed audio data associated with the first direction (e.g., portions of the input audio signals corresponding to the first direction), a second beam may correspond to second beamformed audio data associated with the second direction (e.g., portions of the input audio signals corresponding to the second direction), and so on. For ease of explanation, as used herein "beams" refer to the beamformed audio signals that are generated by the beamforming operation. Therefore, a first beam corresponds to first audio data associated with a first direction, whereas a first directional calculation corresponds to the first filter coefficients used to generate the first beam.

An audio signal is a representation of sound and an electronic representation of an audio signal may be referred to as audio data, which may be analog and/or digital without departing from the disclosure. For ease of illustration, the disclosure may refer to either audio data (e.g., far-end reference audio data or playback audio data, microphone audio data, near-end reference data or input audio data, etc.) or audio signals (e.g., playback signal, far-end reference signal, microphone signal, near-end reference signal, etc.) without departing from the disclosure. Additionally or alternatively, portions of a signal may be referenced as a portion of the signal or as a separate signal and/or portions of audio data may be referenced as a portion of the audio data or as separate audio data. For example, a first audio signal may correspond to a first period of time (e.g., 30 seconds) and a portion of the first audio signal corresponding to a second period of time (e.g., 1 second) may be referred to as a first portion of the first audio signal or as a second audio signal without departing from the disclosure. Similarly, first audio data may correspond to the first period of time (e.g., 30 seconds) and a portion of the first audio data corresponding to the second period of time (e.g., 1 second) may be referred to as a first portion of the first audio data or second audio data without departing from the disclosure. Audio signals and audio data may be used interchangeably, as well; a first audio signal may correspond to the first period of time (e.g., 30 seconds) and a portion of the first audio signal corresponding to a second period of time (e.g., 1 second) may be referred to as first audio data without departing from the disclosure.

As used herein, audio signals or audio data (e.g., far-end reference audio data, near-end reference audio data, microphone audio data, or the like) may correspond to a specific range of frequency bands. For example, far-end reference audio data and/or near-end reference audio data may correspond to a human hearing range (e.g., 20 Hz-20 kHz), although the disclosure is not limited thereto.

Playback audio data $x_r(t)$ (e.g., far-end reference signal) corresponds to audio data that will be output by the loudspeaker(s) 114 to generate playback audio (e.g., echo signal $y(t)$). For example, the device 110 may stream music or output speech associated with a communication session (e.g., audio or video telecommunication). In some examples, the playback audio data may be referred to as far-end reference audio data, loudspeaker audio data, and/or the like without departing from the disclosure. For ease of illustration, the following description will refer to this audio data as playback audio data or reference audio data. As noted above, the playback audio data may be referred to as playback signal(s) $x_r(t)$ without departing from the disclosure.

Microphone audio data $x_m(t)$ corresponds to audio data that is captured by one or more microphone(s) 112 prior to the device 110 performing audio processing such as AIC processing. The microphone audio data $x_m(t)$ may include local speech $s(t)$ (e.g., an utterance, such as near-end speech generated by the user 10), an "echo" signal $y(t)$ (e.g., portion of the playback audio $x_r(t)$ captured by the microphone(s) 114), acoustic noise $n(t)$ (e.g., ambient noise in an environment around the device 110), and/or the like. As the microphone audio data is captured by the microphone(s) 112 and captures audio input to the device 110, the microphone audio data may be referred to as input audio data, near-end audio data, and/or the like without departing from the disclosure. For ease of illustration, the following description will refer to this signal as microphone audio data. As noted above, the microphone audio data may be referred to as a microphone signal without departing from the disclosure.

An "echo" signal $y(t)$ corresponds to a portion of the playback audio that reaches the microphone(s) 112 (e.g., portion of audible sound(s) output by the loudspeaker(s) 114 that is recaptured by the microphone(s) 112) and may be referred to as an echo or echo data $y(t)$.

Output audio data corresponds to audio data after the device 110 performs audio processing (e.g., AIC processing, ANC processing, AEC processing, and/or the like) to isolate the local speech $s(t)$. For example, the output audio data $r(t)$ corresponds to the microphone audio data $x_m(t)$ after subtracting the reference signal(s) (e.g., using adaptive interference cancellation (AIC) 120), optionally removing noise (e.g., using beamformer/AIC component 122), and/or other audio processing known to one of skill in the art. As noted above, the output audio data may be referred to as output audio signal(s) without departing from the disclosure, and one of skill in the art will recognize that the output audio data may also be referred to as an error audio data m(t), error signal m(t) and/or the like.

FIGS. 2A-2D illustrate examples of frame indexes, tone indexes, channel indexes, and performing time alignment. As described above, the device 110 may generate microphone audio data $x_m(t)$ using microphone(s) 112. For example, a first microphone 112a may generate first microphone audio data $x_{m1}(t)$ in a time domain, a second microphone 112b may generate second microphone audio data $x_{m2}(t)$ in the time domain, and so on. As illustrated in FIG. 2A, a time domain signal may be represented as microphone audio data x(t) 210, which is comprised of a sequence of individual samples of audio data. Thus, x(t) denotes an individual sample that is associated with a time t.

While the microphone audio data x(t) 210 is comprised of a plurality of samples, in some examples the device 110 may group a plurality of samples and process them together. As illustrated in FIG. 2A, the device 110 may group a number of samples together in a frame to generate microphone audio data x(n) 212. As used herein, a variable x(n) corresponds to the time-domain signal and identifies an individual frame (e.g., fixed number of samples s) associated with a frame index n.

Additionally or alternatively, the device 110 may convert microphone audio data x(n) 212 from the time domain to the frequency domain or subband domain. For example, the device 110 may perform Discrete Fourier Transforms (DFTs) (e.g., Fast Fourier transforms (FFTs), short-time Fourier Transforms (STFTs), and/or the like) to generate microphone audio data X(n, k) 214 in the frequency domain or the subband domain. As used herein, a variable X(n, k) corresponds to the frequency-domain signal and identifies an individual frame associated with frame index n and tone index k. As illustrated in FIG. 2A, the microphone audio data x(t) 212 corresponds to time indexes 216, whereas the microphone audio data x(n) 212 and the microphone audio data X(n, k) 214 corresponds to frame indexes 218.

A Fast Fourier Transform (FFT) is a Fourier-related transform used to determine the sinusoidal frequency and phase content of a signal, and performing FFT produces a one-dimensional vector of complex numbers. This vector can be used to calculate a two-dimensional matrix of frequency magnitude versus frequency. In some examples, the system 100 may perform FFT on individual frames of audio data and generate a one-dimensional and/or a two-dimensional matrix corresponding to the microphone audio data X(n). However, the disclosure is not limited thereto and the system 100 may instead perform short-time Fourier transform (STFT) operations without departing from the disclosure. A short-time Fourier transform is a Fourier-related transform used to determine the sinusoidal frequency and phase content of local sections of a signal as it changes over time.

Using a Fourier transform, a sound wave such as music or human speech can be broken down into its component "tones" of different frequencies, each tone represented by a sine wave of a different amplitude and phase. Whereas a time-domain sound wave (e.g., a sinusoid) would ordinarily be represented by the amplitude of the wave over time, a frequency domain representation of that same waveform comprises a plurality of discrete amplitude values, where each amplitude value is for a different tone or "bin." So, for example, if the sound wave consisted solely of a pure sinusoidal 1 kHz tone, then the frequency domain representation would consist of a discrete amplitude spike in the bin containing 1 kHz, with the other bins at zero. In other words, each tone "k" is a frequency index (e.g., frequency bin).

FIG. 2A illustrates an example of time indexes 216 (e.g., microphone audio data x(t) 210) and frame indexes 218 (e.g., microphone audio data x(n) 212 in the time domain and microphone audio data X(n, k) 216 in the frequency domain). For example, the system 100 may apply FFT processing to the time-domain microphone audio data x(n) 212, producing the frequency-domain microphone audio data X(n,k) 214, where the tone index "k" (e.g., frequency index) ranges from 0 to K and "n" is a frame index ranging from 0 to N. As illustrated in FIG. 2A, the history of the values across iterations is provided by the frame index "n", which ranges from 1 to N and represents a series of samples over time.

Figure 2B:
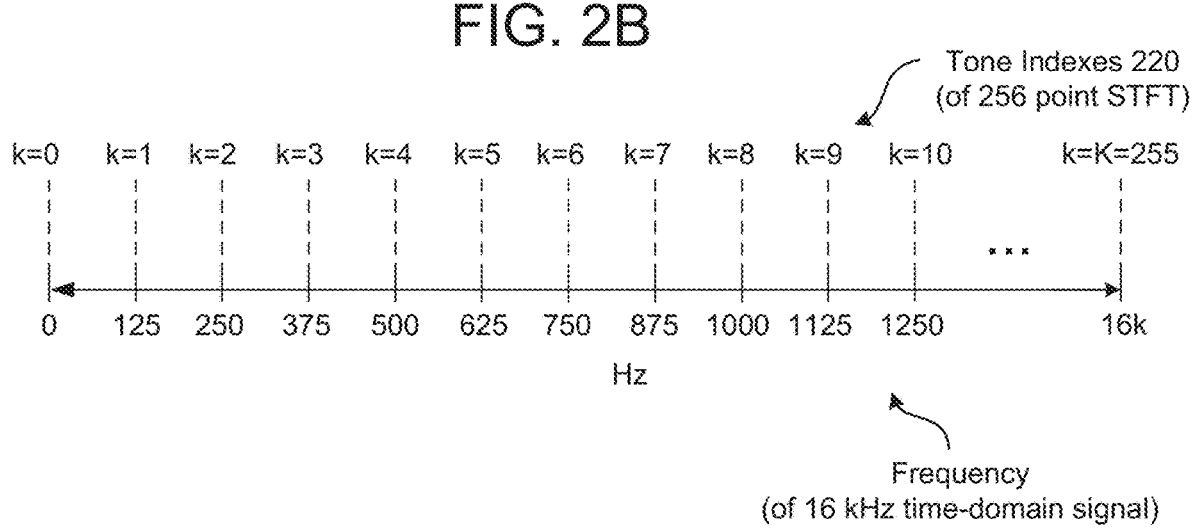

FIG. 2B illustrates an example of performing a K-point FFT on a time-domain signal. As illustrated in FIG. 2B, if a 256-point FFT is performed on a 16 kHz time-domain signal, the output is 256 complex numbers, where each complex number corresponds to a value at a frequency in increments of 16 kHz/256, such that there is 125 Hz between points, with point 0 corresponding to 0 Hz and point 255 corresponding to 16 kHz. As illustrated in FIG. 2B, each tone index 220 in the 256-point FFT corresponds to a frequency range (e.g., subband) in the 16 kHz time-domain signal. While FIG. 72B illustrates the frequency range being divided into 256 different subbands (e.g., tone indexes), the disclosure is not limited thereto and the system 100 may divide the frequency range into K different subbands (e.g., K indicates an FFT size). While FIG. 2B illustrates the tone index 220 being generated using a Fast Fourier Transform (FFT), the disclosure is not limited thereto. Instead, the tone index 220 may be generated using Short-Time Fourier Transform (STFT), generalized Discrete Fourier Transform (DFT) and/or other transforms known to one of skill in the art (e.g., discrete cosine transform, non-uniform filter bank, etc.).

Figure 2C:
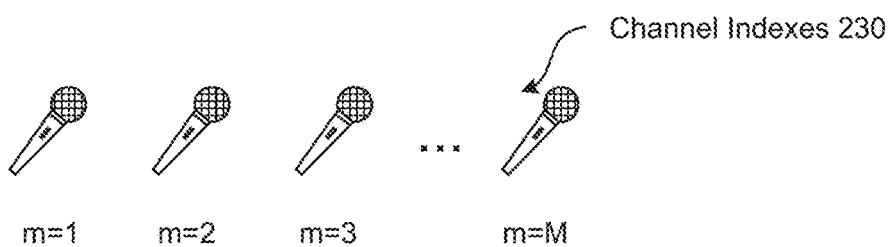

The system 100 may include multiple microphone(s) 112, with a first channel m corresponding to a first microphone 112a, a second channel (m+1) corresponding to a second microphone 112b, and so on until a final channel (MP) that corresponds to microphone 114M. FIG. 2C illustrates channel indexes 230 including a plurality of channels from channel m1 to channel M. While many drawings illustrate two channels (e.g., two microphones 112), the disclosure is not limited thereto and the number of channels may vary. For the purposes of discussion, an example of system 100 includes "M" microphones 112 (M>1) for hands free near-end/far-end distant speech recognition applications.

While FIGS. 2A-2C are described with reference to the microphone audio data $x_m(t)$, the disclosure is not limited thereto and the same techniques apply to the playback audio data $x_r(t)$ without departing from the disclosure. Thus, playback audio data $x_r(t)$ indicates a specific time index t from a series of samples in the time-domain, playback audio data $x_r(n)$ indicates a specific frame index n from series of frames in the time-domain, and playback audio data $X_r(n, k)$ indicates a specific frame index n and frequency index k from a series of frames in the frequency-domain.

Prior to converting the microphone audio data $x_m(n)$ and the playback audio data $x_r(n)$ to the frequency-domain, the device 110 must first perform time-alignment to align the playback audio data $x_r(n)$ with the microphone audio data $x_m(n)$. For example, due to nonlinearities and variable delays associated with sending the playback audio data $x_r(n)$ to the loudspeaker(s) 114 using a wireless connection, the playback audio data $x_r(n)$ is not synchronized with the microphone audio data $x_m(n)$. This lack of synchronization may be due to a propagation delay (e.g., fixed time delay) between the playback audio data $x_r(n)$ and the microphone audio data $x_m(n)$, clock jitter and/or clock skew (e.g., difference in sampling frequencies between the device 110 and the loudspeaker(s) 114), dropped packets (e.g., missing samples), and/or other variable delays.

To perform the time alignment, the device 110 may adjust the playback audio data $x_r(n)$ to match the microphone audio data $x_m(n)$. For example, the device 110 may adjust an offset between the playback audio data $x_r(n)$ and the microphone audio data $x_m(n)$, may add/subtract samples and/or frames from the playback audio data $x_r(n)$, and/or the like. As illustrated in FIG. 2D, raw inputs 250 are illustrated as playback audio data $x_r(n)$ 252, which includes frames $x_{r,1}$-$x_{r,U}$, and microphone audio data $x_m(n)$ 254, including frames $x_{m,1}$-$x_{m,U+V}$. U and V are natural numbers, with V being a maximum frame index delay between the loudspeaker 114 and the microphone 112.

The device 110 may compensate for a propagation delay by offsetting the microphone audio data $x_m(n)$, as illustrated by offset inputs 260. For example, the device 110 may detect a propagation delay of D frames (e.g., 6 frames) and may compensate for this propagation delay by aligning a first frame $x_{r,1}$ of the playback audio data $x_r(n)$ 252 with a seventh frame $x_{m,7}$ of the microphone audio data $x_m(n)$ 254. However, this offset corresponds to a fixed delay between the playback audio data $x_r(n)$ 252 and the microphone audio data $x_m(n)$ 254, so additional alignment is required to compensate for nonlinearities in the system 100.

FIG. 2D illustrates some examples of performing additional time alignment between the playback audio data $x_r(n)$ 252 and the microphone audio data $x_m(n)$ 254 to generate aligned inputs 270. For example, the device 110 may generate playback audio data $x_r(n)$ 272 by modifying the playback audio data $x_r(n)$ 252, such as by omitting a frame, duplicating a frame, and/or the like to adjust for the nonlinearities of the system. As illustrated in FIG. 2D, the playback audio data $x_r(n)$ 272 illustrates an omitted frame 276 (e.g., fourth frame $x_{r,4}$ is not included in the playback audio data $x_r(n)$ 272) and a duplicate frame 278 (e.g., seventh frame $x_{r,7}$ is repeated in the playback audio data $x_r(n)$ 272). This is intended for illustrative purposes only and the playback audio data $x_r(n)$ 272 may be modified using any techniques known to one of skill in the art to synchronize with the microphone audio data $x_m(n)$ 254.

In some examples, the device 110 may modify both the microphone audio data $x_m(n)$ 254 and the playback audio data $x_r(n)$ 272 in order to synchronize the microphone audio data $x_m(n)$ 254 and the playback audio data $x_r(n)$ 272. However, performing nonlinear modifications to the microphone audio data $x_m(n)$ 254 results in first microphone audio data $x_m(n)$ 254a associated with a first microphone to no longer be synchronized with second microphone audio data $x_m(n)$ 254b associated with a second microphone. Thus, the device 110 may instead modify only the playback audio data $x_r(n)$ 272 so that the playback audio data $x_r(n)$ 272 is synchronized with the first microphone audio data $x_m(n)$ 254a.

Further details of the device operation are described below following a discussion of directionality in reference to FIGS. 3-4C.

Figure 3:
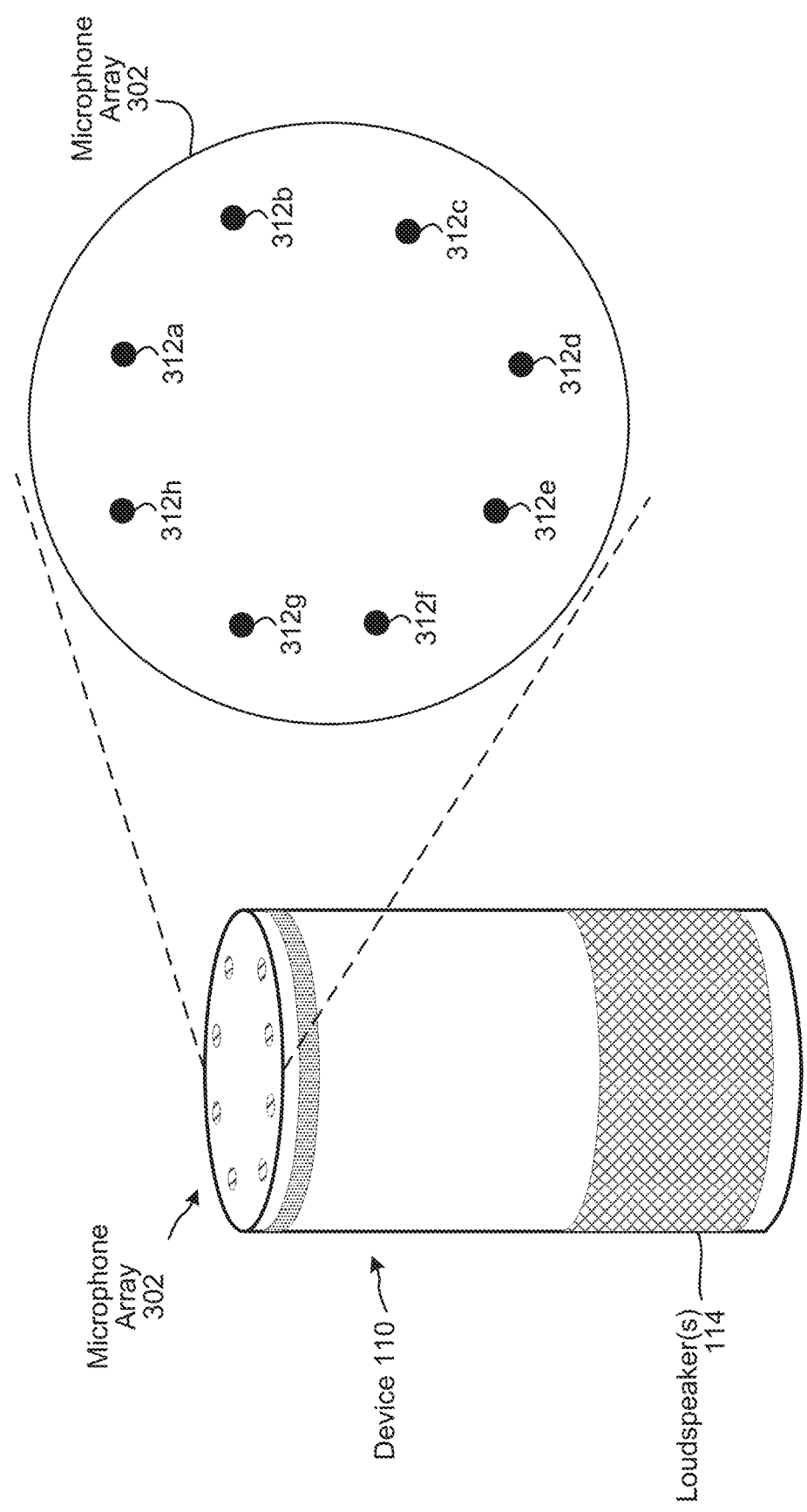
FIG. 3 illustrates a microphone array according to embodiments of the present disclosure.

As illustrated in FIG. 3, a device 110 may include, among other components, a microphone array 302 including a plurality of microphone(s) 312, one or more loudspeaker(s) 114, a beamformer unit (as discussed below), or other components. The microphone array 302 may include a number of different individual microphones 312. In the example configuration of FIG. 3, the microphone array includes eight (8) microphones, 312a-312h. The individual microphones 312 may capture sound and pass the resulting audio signal created by the sound to a downstream component, such as an analysis filterbank discussed below. Each individual piece of audio data captured by a microphone may be in a time domain. To isolate audio from a particular direction, the device may compare the audio data (or audio signals related to the audio data, such as audio signals in a sub-band domain) to determine a time difference of detection of a particular segment of audio data. If the audio data for a first microphone includes the segment of audio data earlier in time than the audio data for a second microphone, then the device may determine that the source of the audio that resulted in the segment of audio data may be located closer to the first microphone than to the second microphone (which resulted in the audio being detected by the first microphone before being detected by the second microphone).

Figure 4A:
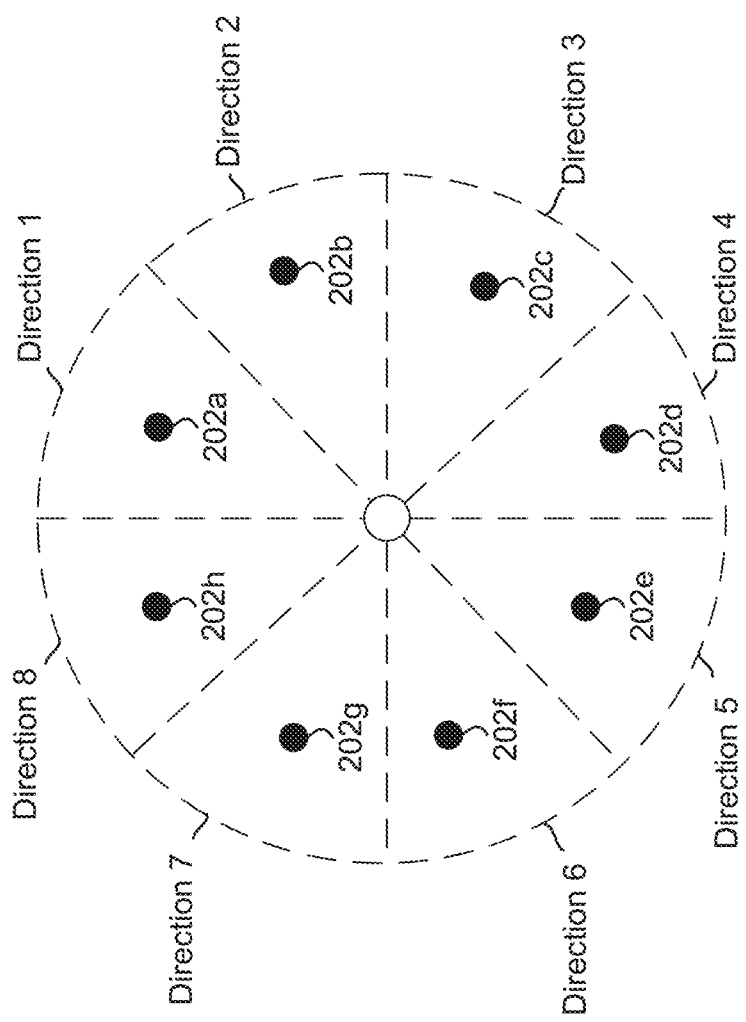
FIG. 4A illustrates associating directions with microphones of a microphone array according to embodiments of the present disclosure.

Using such direction isolation techniques, a device 110 may isolate directionality of audio sources. As shown in FIG. 4A, a particular direction may be associated with a particular microphone 312 of a microphone array, where the azimuth angles for the plane of the microphone array may be divided into bins (e.g., 0-45 degrees, 46-90 degrees, and so forth) where each bin direction is associated with a microphone in the microphone array. For example, direction 1 is associated with microphone 312a, direction 2 is associated with microphone 312b, and so on. Alternatively, particular directions and/or beams may not necessarily be associated with a specific microphone without departing from the present disclosure. For example, the device 110 may include any number of microphones and/or may isolate any number of directions without departing from the disclosure.

To isolate audio from a particular direction the device may apply a variety of audio filters to the output of the microphones where certain audio is boosted while other audio is dampened, to create isolated audio data corresponding to a particular direction, which may be referred to as a beam. While in some examples the number of beams may correspond to the number of microphones, the disclosure is not limited thereto and the number of beams may vary from the number of microphones without departing from the disclosure. For example, a two-microphone array may be processed to obtain more than two beams, using filters and beamforming techniques to isolate audio from more than two directions. Thus, the number of microphones may be more than, less than, or the same as the number of beams. The beamformer unit of the device may have a fixed beamformer (FBF) unit and/or an adaptive beamformer (ABF) unit processing pipeline for each beam, as explained below.

The device 110 may use various techniques to determine the beam corresponding to the look-direction. For example, if audio is first detected by a particular microphone, the device 110 may determine that the source of the audio is associated with the direction of the microphone in the array. Other techniques may include determining which microphone detected the audio with a largest amplitude (which in turn may result in a highest strength of the audio signal portion corresponding to the audio). Other techniques (either in the time domain or in the sub-band domain) may also be used such as calculating a signal-to-noise ratio (SNR) for each beam, performing voice activity detection (VAD) on each beam, or the like.

Figure 4B:
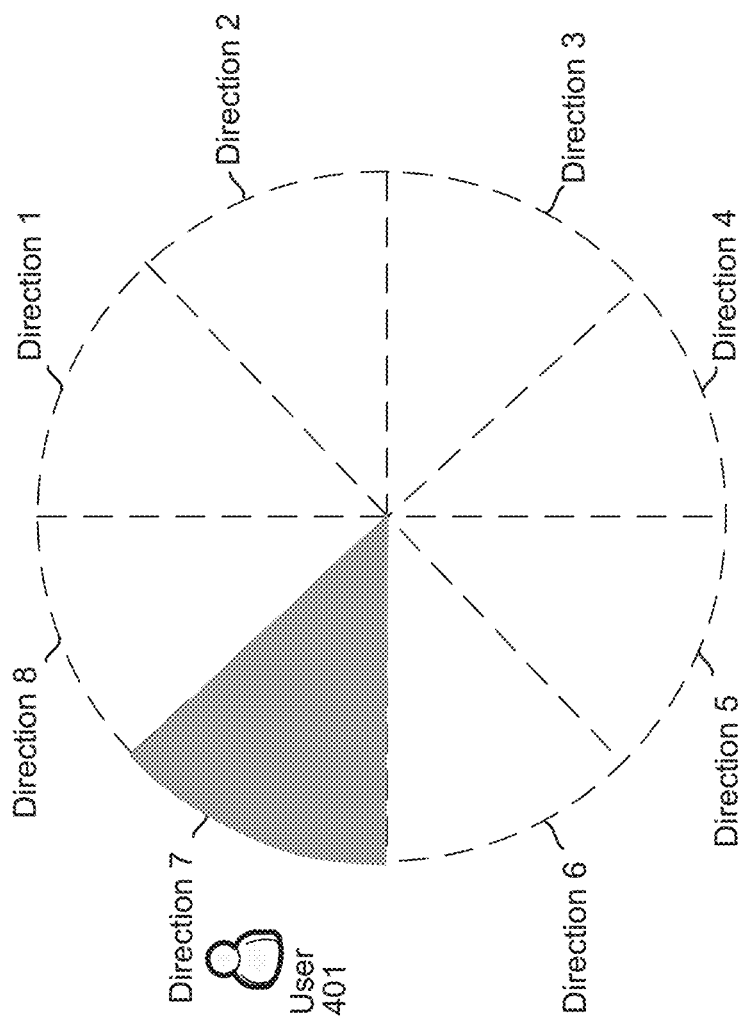
FIGS. 4B and 4C illustrate isolating audio from a direction to focus on a desired audio source according to embodiments of the present disclosure.
Figure 4C:
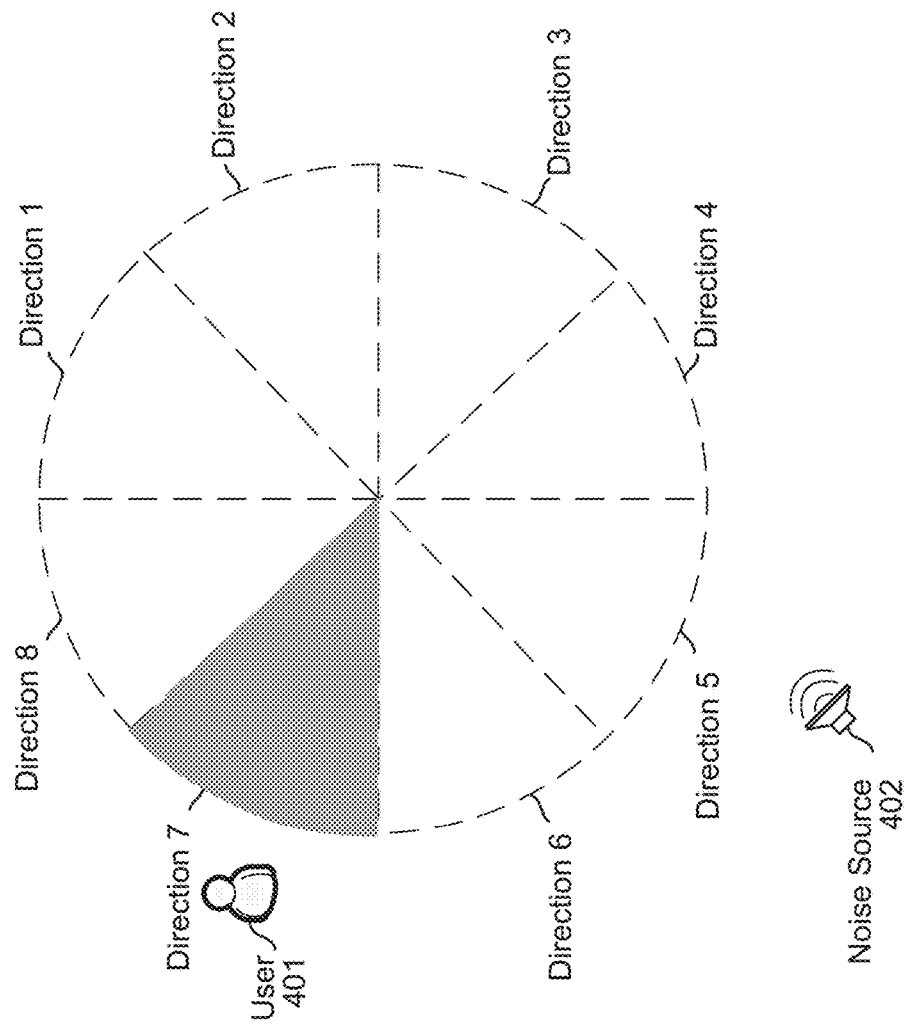

To illustrate an example, if audio data corresponding to a user's speech is first detected and/or is most strongly detected by microphone 312g, the device 110 may determine that a user 401 is located at a location in direction 7. Using a FBF unit or other such component, the device 110 may isolate audio data coming from direction 7 using techniques known to the art and/or explained herein. Thus, as shown in FIG. 4B, the device 110 may boost audio data coming from direction 7, thus increasing the amplitude of audio data corresponding to speech from the user 401 relative to other audio data captured from other directions. In this manner, noise from diffuse sources that is coming from all the other directions will be dampened relative to the desired audio (e.g., speech from user 401) coming from direction 7.

One drawback to the FBF unit approach is that it may not function as well in dampening/canceling noise from a noise source that is not diffuse, but rather coherent and focused from a particular direction. For example, as shown in FIG. 4C, a noise source 402 may be coming from direction 5 but may be sufficiently loud that noise canceling/beamforming techniques using an FBF unit alone may not be sufficient to remove all the undesired audio coming from the noise source 402, thus resulting in an ultimate output audio signal determined by the device 110 that includes some representation of the desired audio resulting from user 401 but also some representation of the undesired audio resulting from noise source 402.

Conventional systems isolate the speech in the input audio data by performing acoustic echo cancellation (AEC) to remove the echo signal from the input audio data. For example, conventional acoustic echo cancellation may generate a reference signal based on the playback audio data and may remove the reference signal from the input audio data to generate output audio data representing the speech.

As an alternative to generating the reference signal based on the playback audio data, Adaptive Reference Algorithm (ARA) processing may generate an adaptive reference signal based on the input audio data. The ARA processing is discussed in greater detail above with regard to FIG. 1. For example, the device 110 may perform beamforming using the input audio data to generate a plurality of audio signals (e.g., beamformed audio data) corresponding to particular directions (e.g., a first audio signal corresponding to a first direction, a second audio signal corresponding to a second direction, etc.). After beamforming, the device 110 may optionally perform adaptive interference cancellation using the ARA processing on the beamformed audio data. For example, after generating the plurality of audio signals, the device 110 may determine one or more target signal(s), determine one or more reference signal(s), and generate output audio data by subtracting at least a portion of the reference signal(s) from the target signal(s). For example, the ARA processing may select the first audio signal as a target signal (e.g., the first audio signal includes a representation of speech) and the second audio signal as a reference signal (e.g., the second audio signal includes a representation of the echo and/or other acoustic noise), and may perform AIC by removing (e.g., subtracting) the reference signal from the target signal.

To improve noise cancellation, the AIC component may amplify audio signals from two or more directions other than the look direction (e.g., target signal). These audio signals represent noise signals so the resulting amplified audio signals may be referred to as noise reference signals. The device 110 may then weight the noise reference signals, for example using filters, and combine the weighted noise reference signals into a combined (weighted) noise reference signal. Alternatively the device 110 may not weight the noise reference signals and may simply combine them into the combined noise reference signal without weighting. The device 110 may then subtract the combined noise reference signal from the target signal to obtain a difference (e.g., noise-cancelled audio data). The device 110 may then output that difference, which represents the desired output audio signal with the noise removed. The diffuse noise is removed by the FBF unit when determining the target signal and the directional noise is removed when the combined noise reference signal is subtracted.

The device 110 may dynamically select target signal(s) and/or reference signal(s). Thus, the target signal(s) and/or the reference signal(s) may be continually changing over time based on speech, acoustic noise(s), ambient noise(s), and/or the like in an environment around the device 110. For example, the adaptive beamformer may select the target signal(s) by detecting speech, based on signal strength values (e.g., signal-to-noise ratio (SNR) values, average power values, etc.), and/or using other techniques or inputs, although the disclosure is not limited thereto. As an example of other techniques or inputs, the device 110 may capture video data corresponding to the input audio data, analyze the video data using computer vision processing (e.g., facial recognition, object recognition, or the like) to determine that a user is associated with a first direction, and select the target signal(s) by selecting the first audio signal corresponding to the first direction. Similarly, the device 110 may identify the reference signal(s) based on the signal strength values and/or using other inputs without departing from the disclosure. Thus, the target signal(s) and/or the reference signal(s) selected by the device 110 may vary, resulting in different filter coefficient values over time.

FIGS. 5A-5C illustrate dynamic and fixed reference beam selection according to embodiments of the present disclosure. As discussed above, Adaptive Reference Algorithm (ARA) processing may generate an adaptive reference signal based on the microphone audio data. To illustrate an example, the ARA processing may perform beamforming using the microphone audio data to generate a plurality of audio signals (e.g., beamformed audio data) corresponding to particular directions. For example, the plurality of audio signals may include a first audio signal corresponding to a first direction, a second audio signal corresponding to a second direction, a third audio signal corresponding to a third direction, and so on. The ARA processing may select the first audio signal as a target signal (e.g., the first audio signal includes a representation of speech) and the second audio signal as a reference signal (e.g., the second audio signal includes a representation of the echo and/or other acoustic noise) and may perform acoustic echo cancellation by removing (e.g., subtracting) the reference signal from the target signal. As the microphone audio data is not limited to the echo signal, the ARA processing may remove other acoustic noise represented in the microphone audio data in addition to removing the echo. Therefore, the ARA processing may be referred to as performing adaptive interference cancellation (AIC) (e.g., adaptive acoustic interference cancellation), adaptive noise cancellation (ANC), and/or acoustic echo cancellation (AEC) without departing from the disclosure.

In some examples, the ARA processing may dynamically select the reference beam based on which beamformed audio data has the largest amplitude and/or highest power. Thus, the ARA processing adaptively selects the reference beam depending on the power associated with each beam. This technique works well during far-end single-talk conditions, as the loudspeaker(s) 114 generating output audio based on the far-end reference signal are louder than other sources of noise and therefore the ARA processing selects the beamformed audio data associated with the loudspeaker(s) 114 as a reference signal.

FIG. 5A illustrates an example of dynamic reference beam selection during far-end single-talk conditions. As illustrated in FIG. 5A, the ARA processing selects the beam associated with a noise source 502 (e.g., the loudspeaker(s) 114) as the reference beam. Thus, even as the noise source 502 moves between beams (e.g., beginning at direction 7 and moving to direction 1), the ARA processing is able to dynamically select beamformed audio data associated with the noise source 502 as the reference signal. The ARA processing may select beamformed audio data associated with the user 501 (e.g., direction 5) as a target signal, performing adaptive noise cancellation to remove the reference signal from the target signal and generate output audio data.

While this technique works well during far-end single-talk conditions, performing dynamic reference beam selection during near-end single-talk conditions and/or double-talk conditions does not provide good results. For example, during near-end single-talk conditions and/or when local speech generated by a user 501 is louder than the loudspeaker(s) 114 during double-talk conditions, the ARA processing selects the beam associated with the user 501 instead of the beam associated with the noise source 502 as the reference beam.

FIG. 5B illustrates an example of dynamic reference beam selection during near-end single-talk conditions. As illustrated in FIG. 5B, the ARA processing initially selects a first beam associated with a noise source 502 (e.g., direction 7 associated with the loudspeaker(s) 114) as the reference beam. Thus, the ARA processing selects first beamformed audio data associated with the noise source 502 (e.g., direction 7) as the reference signal and selects second beamformed audio data associated with the user 501 (e.g., direction 5) as a target signal, performing adaptive noise cancellation to remove the reference signal from the target signal and generate output audio data.

However, during near-end single-talk conditions the noise source 502 is silent and the ARA processing only detects audio associated with the local speech generated by the user 501. As the local speech is the loudest audio, the ARA processing selects a second beam associated with the user 501 (e.g., direction 5 associated with the local speech) as the reference beam. Thus, the ARA processing selects the second beamformed audio data associated with the user 501 (e.g., direction 5) as the reference signal. Whether the ARA processing selects the second beamformed audio data associated with the user 501 (e.g., direction 5) as a target signal, or selects beamformed audio data in a different direction as the target signal, the output audio data generated by performing adaptive noise cancellation does not include the local speech.

To improve the ARA processing, the device 110 may freeze reference beam selection during near-end single-talk conditions and/or during double-talk conditions. Thus, the ARA processing may dynamically select the reference beam during far-end single-talk conditions, but as soon as local speech is detected (e.g., near-end single-talk conditions and/or double-talk conditions are detected), the ARA processing may store the most-recently selected reference beam and use this reference beam until far-end single-talk conditions resume. For example, during near-end single-talk conditions and/or when local speech generated by a user 501 is louder than the loudspeaker(s) 114 during double-talk conditions, the ARA processing ignores the beam with the most power and continues to use the reference beam previously selected during far-end single-talk conditions, as this reference beam is most likely to be associated with a noise source.

FIG. 5C illustrates an example of freezing reference beam selection during near-end single-talk conditions. As illustrated in FIG. 5C, the ARA processing initially selects a first beam associated with a noise source 502 (e.g., direction 7 associated with the loudspeaker(s) 114) as the reference beam during far-end single-talk conditions. Thus, the ARA processing selects first beamformed audio data associated with the noise source 502 (e.g., direction 7) as the reference signal and selects second beamformed audio data associated with the user 501 (e.g., direction 5) as a target signal, performing adaptive noise cancellation to remove the reference signal from the target signal and generate output audio data.

When the device 110 detects near-end single-talk conditions, the ARA processing freezes dynamic reference beam selection and stores the first beam associated with the noise source 502 (e.g., direction 7 associated with the loudspeaker(s) 114) as the reference beam until far-end single-talk conditions resume. Thus, during near-end single-talk conditions and/or when local speech generated by the user 501 is louder than the noise source 502 during double-talk conditions, the ARA processing continues to select the first beamformed audio data associated with the noise source 502 (e.g., direction 7) as the reference signal and selects the second beamformed audio data associated with the user 501 (e.g., direction 5) as the target signal, performing adaptive noise cancellation to remove the reference signal from the target signal and generate the output audio data.

As discussed above with regard to FIG. 1, the device 110 may generate frequency mask data indicating time-frequency bands in which the playback audio data $X_r(n,k)$ has a strong correlation with the microphone audio data $X_m(n,k)$. For example, the device 110 may determine a first correlation value between a first time-frequency band within the playback audio data $X_r(n_1,k_1)$ and the first time-frequency band within the microphone audio data $X_m(n_1,k_1)$, may determine that the first correlation value exceeds a threshold value, and may associate the first time-frequency band with the loudspeaker by storing a first value in loudspeaker mask data. In contrast, the device 110 may determine a second correlation value between a second time-frequency band within the playback audio data $X_r(n_1,k_1)$ and the second time-frequency band within the microphone audio data $X_m(n_1,k_1)$, may determine that the second correlation value does not exceed the threshold value, and may not associate the second time-frequency band with the loudspeaker by storing a second value in the loudspeaker mask data.

FIG. 6 illustrates an example of generating mask data according to examples of the present disclosure. As illustrated in FIG. 6, the device 110 may generate microphone signals $x_1[n]$-$x_M[n]$ 602, with M being a natural number corresponding to the maximum number of microphones 112 and/or microphone signals 602. The device 110 may receive reference signal $x_r[n]$ 604 (e.g., playback audio data) and may input the microphone signals $x_1[n]$-$x_M[n]$ 602 and the reference signal $x_r[n]$ 604 into time alignment component 610.

While FIG. 6 illustrates a plurality of microphone signals 602, the disclosure is not limited thereto and the device 110 may generate a single microphone signal 602a, two microphone signals 602a/602b, and/or any number of microphone signals 602 without departing from the disclosure. In some examples, the device 110 may generate a plurality of microphone signals 602 but only input a single microphone signal 602 to the time alignment component 610. For ease of illustration, multiple microphone signals may be illustrated with a single thick arrow. For example, time-aligned microphone signals x'$_i$[n] 612 are illustrated using a single thick arrow, with i being a natural number corresponding to an individual microphone signal (e.g., ith microphone signal). While the time-aligned microphone signals 612 are illustrated using a single arrow, a number of the time-aligned microphone signals 612 may be equal to the number of microphone signals 602 that were input to the time alignment component 610.

The time alignment component 610 may perform time alignment, using the techniques described above with regard to FIG. 2B, to align the reference signal 604 with at least one of the microphone signals 602. Thus, FIG. 6 illustrates the time alignment component 610 outputting time-aligned microphone signals x'$_i$[n] 612 and a time-aligned reference signal x'$_i$[n] 614. As described above with regard to FIG. 2B, the time alignment component 610 may perform a cross-correlation peak detecting method and may synchronize the time-aligned microphone signals x'$_i$[n] 612 and the time-aligned reference signal x'$_i$[n] 614 using any techniques known to one of skill in the art.

While FIG. 6 illustrates time-aligned microphone signals x'$_i$[n] 612 separately from the microphone signals 602, the disclosure is not limited thereto. In some examples, the time alignment component 610 may not modify the microphone signals 602, such that the time-aligned microphone signals x'$_i$[n] 612 are identical to the microphone signals 602. Thus, in these examples, the time alignment component 610 may synchronize the time-aligned reference signal x'$_i$[n] 614 with the microphone signals 602 without affecting the microphone signals 602.

While the time-aligned reference signal x'$_i$[n] 614 is synchronized with the microphone signals x'$_i$[n] 612, this corresponds to a rough or coarse synchronization. This synchronization is not precise enough to perform acoustic echo cancellation (AEC) processing using the time-aligned reference signal x'$_i$[n] 614 directly, as the rough time alignment results in errors that degrade performance. Instead, the device 110 may use the time-aligned reference signal x'$_i$[n] 614 to estimate a reference signal using the microphone signals 602, resulting in a reference signal that is precisely synchronized with the microphone signals 602.

The time-aligned microphone signals x'$_i$[n] 612 and the time-aligned reference signal x'$_i$[n] 614 may be input to a Short-Term Fourier Transform (STFT) component 620 that performs STFT processing to convert from a time domain to a frequency domain. Thus, the STFT component 620 generates microphone signals $X_i(t,f)$ 622 and a reference signal $X_r(t,f)$ 624 in the frequency domain or subband domain, with t indicating a time index (e.g., frame index n) and f indicating a frequency index k (e.g., tone index). As discussed above, the disclosure is not limited to performing STFT processing and the device 110 may convert from the time domain to the frequency domain using any techniques known to one of skill in the art without departing from the disclosure.

The microphone signals $X_i(t,f)$ 622 and the reference signal $X_r(t,f)$ 624 are input to a time frequency mask estimation component 630 that generates loudspeaker mask data $M_L(t,f)$ 632. For example, the time frequency mask estimation component 630 may use at least one of the microphone signals $X_i(t,f)$ 622 along with the reference signal $X_r(t,f)$ 624 to generate the loudspeaker mask data $M_L(t,f)$ 632 based on a correlation between the reference signal $X_r(t,f)$ 624 and one or more of the microphone signals $X_i(t,f)$ 622.

In some examples, the time frequency mask estimation component 630 may estimate the loudspeaker mask data $M_L(t,f)$ 632 by calculating a coherence between the reference signal $X_r(t,f)$ 624 and the one or more of the microphone signals $X_i(t,f)$ 622. For example, the coherence between the two signals $\Gamma_{X_iX_r}(t,f)$ may be calculated using the following equation:

$$\Gamma_{X_iX_r}(t,f) = \frac{\sigma_{X_iX_r}(t,f)}{\sqrt{\sigma_{X_iX_i}(t,f)\sigma_{X_rX_r}(t,f)}} \quad [1]$$

where $\Gamma_{X_iX_r}(t,f)$ is the coherence between the reference signal $X_r(t,f)$ 624 and the one or more of the microphone signals $X_i(t,f)$ 622, $\sigma_{X_iX_r}(t,f)$ is the cross-Power Spectral Density (PSD) of the reference signal $X_r(t,f)$ 624 and the one or more of the microphone signals $X_i(t,f)$ 622, $\sigma_{X_iX_i}(t,f)$ is an auto-PSD of the one or more of the microphone signals $X_i(t,f)$ 622, and $\sigma_{X_rX_r}(t,f)$ is an auto-PSD of the reference signal $X_r(t,f)$ 624.

To generate the loudspeaker mask data $M_L(t,f)$ 632, the time frequency mask estimation 630 may compare the coherence $\Gamma_{X_iX_r}(t,f)$ to a first threshold value (e.g., loudspeaker threshold value $Th_L$). If the coherence $\Gamma_{X_iX_r}(t,f)$ exceeds the loudspeaker threshold value $Th_L$, the time frequency mask estimation 630 may determine that the reference signal $X_r(t,f)$ 624 has a high cross-coherence (e.g., correlation) with the one or more of the microphone signals $X_i(t,f)$ 622 and may set a first value in the loudspeaker mask data $M_L(t,f)$ 632. If the coherence $\Gamma_{X_iX_r}(t,f)$ is below the loudspeaker threshold value $Th_L$, the time frequency mask estimation 630 may determine that the reference signal $X_r(t,f)$ 624 has a low cross-coherence with the one or more of the microphone signals $X_i(t,f)$ 622 and may set a second value in the loudspeaker mask data $M_L(t,f)$ 632.

In some examples, the time frequency mask estimation 630 may optionally generate near-end mask data $M_{NE}(t,f)$ 634 by comparing the coherence $\Gamma_{X_iX_r}(t,f)$ to a second threshold value (e.g., near-end threshold value $Th_{NE}$). If the coherence $\Gamma_{X_iX_r}(t,f)$ is below the near-end threshold value $Th_{NE}$, the time frequency mask estimation 630 may determine that the reference signal $X_r(t,f)$ 624 has a high cross-coherence (e.g., correlation) with near-end sounds and may set a first value in the near-end mask data $M_{NE}(t,f)$ 634. If the coherence $\Gamma_{X_iX_r}(t,f)$ exceeds the near-end threshold value $Th_{NE}$, the time frequency mask estimation 630 may determine that the reference signal $X_r(t,f)$ 624 has a low cross-coherence with near-end sounds and may set a second value in the near-end mask data $M_{NE}(t,f)$ 634.

Figure 7A:
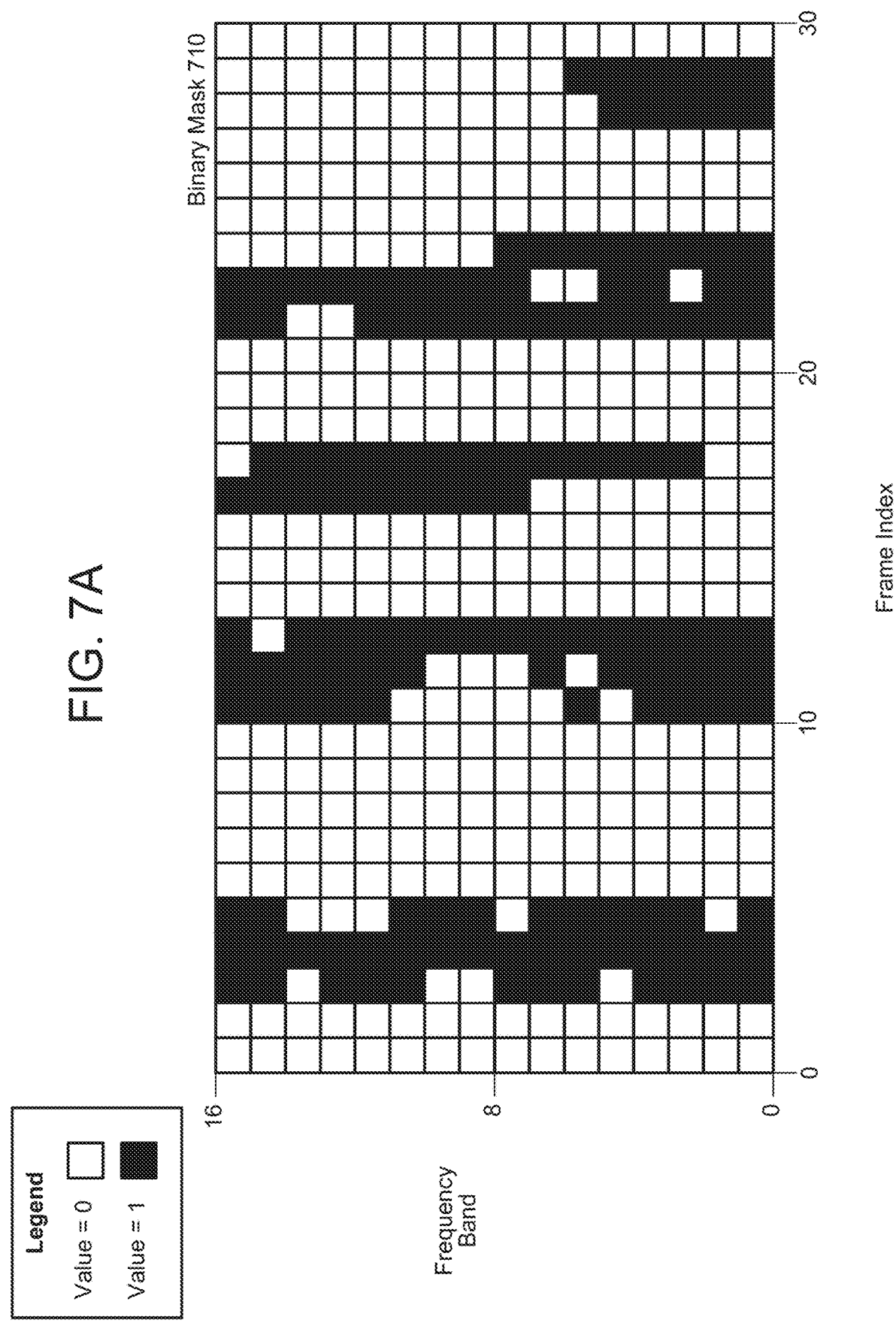
FIGS. 7A-7D illustrate examples of frequency mask data according to embodiments of the present disclosure.

FIGS. 7A-7D illustrate examples of frequency mask data according to embodiments of the present disclosure. As illustrated in FIG. 7A, the device 110 may generate a binary mask 710 indicating first frequency bands that correspond to the loudspeaker(s) 114, with a value of 0 (e.g., white) indicating that the frequency band does not correspond to the loudspeaker(s) 114 and a value of 1 (e.g., black) indicating that the frequency band does correspond to the loudspeaker(s) 114. For example, the device 110 may determine correlation values between the playback audio data $X_r(n,k)$ and the microphone audio data $X_m(n,k)$ to determine which frequency bands and frame indexes correspond to the loudspeaker(s) 114.

Figure 7B:
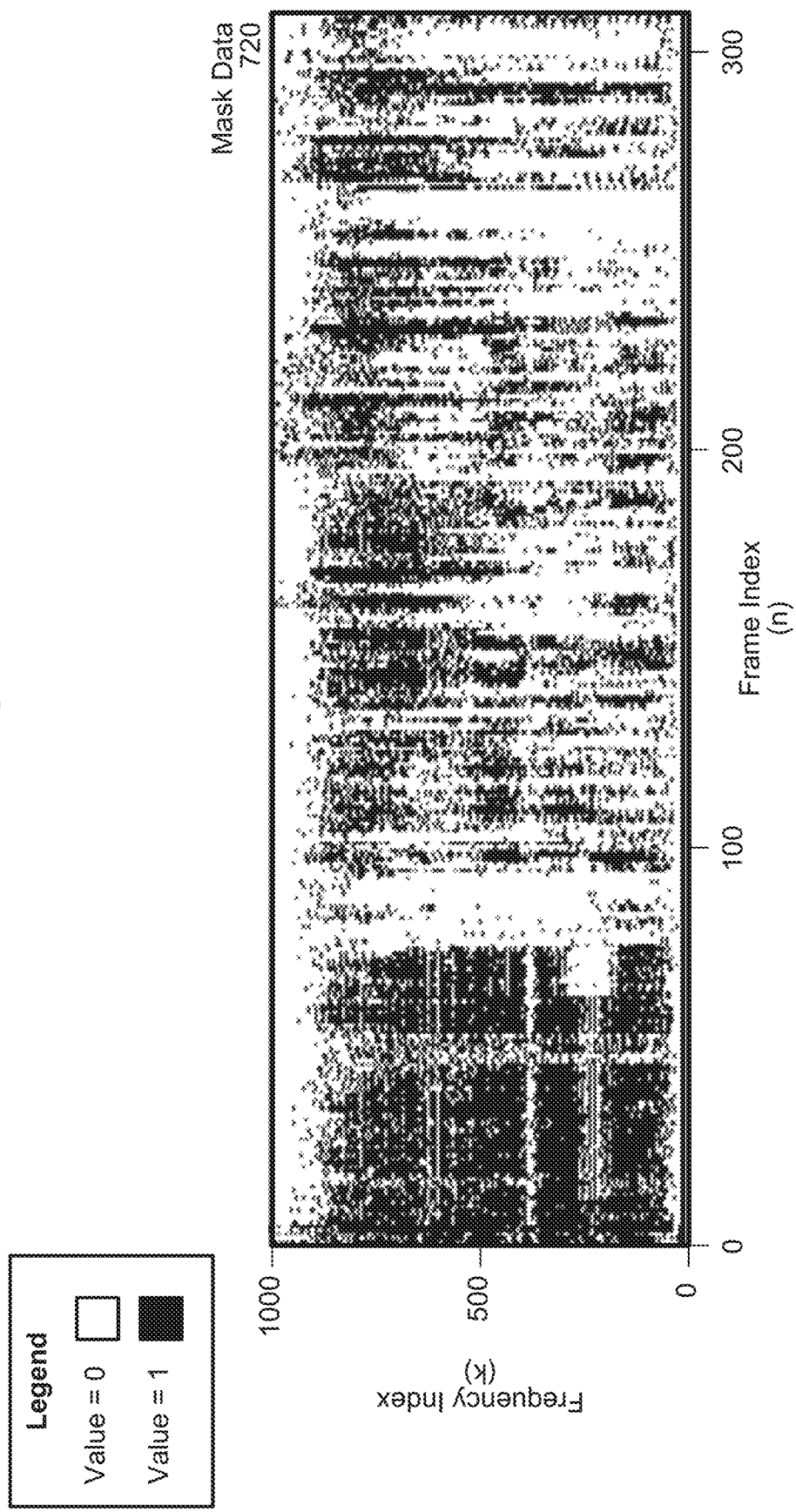

The binary mask 710 indicates frequency bands along the vertical axis and frame indexes along the horizontal axis. For ease of illustration, the binary mask 710 includes only a few frequency bands (e.g., 16). However, the device 110 may determine mask values for any number of frequency bands without departing from the disclosure. For example, FIG. 7B illustrates a binary mask 720 corresponding to 1000 frequency bands, although the device 110 may generate a binary mask for any number of frequency bands without departing from the disclosure.

Figure 7C:
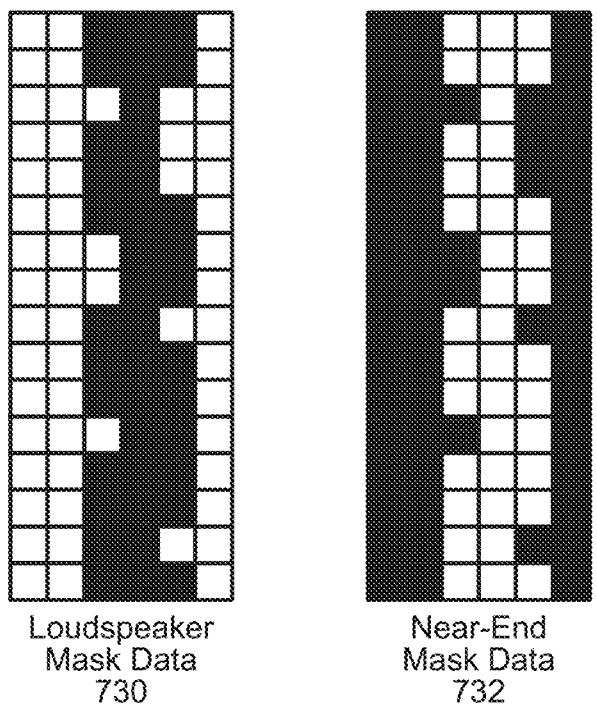

In some examples, the device 110 may divide every frequency band into either first frequency bands (e.g., frequency bands that correspond to the loudspeaker(s) 114) or second frequency bands (e.g., frequency bands that do not correspond to the loudspeaker(s) 114). For example, the device 110 may generate loudspeaker mask data indicating the first frequency bands and near-end mask data indicating the second frequency bands. As illustrated in FIG. 7C, loudspeaker mask data 730 indicates the first frequency bands in black and the second frequency bands in white, while near-end mask data 732 indicates the second frequency bands in black and the first frequency bands in white. If the device 110 generates the loudspeaker mask data 730 as binary mask data (e.g., values of zero or one), each time-frequency band may correspond to either the loudspeaker mask data 730 or the near-end mask data 732 (e.g., non-loudspeaker mask data). Thus, the device 110 may determine the first frequency bands using the loudspeaker mask data 730 and/or determine the second frequency bands based on the near-end mask data 732 or an inverse of the loudspeaker mask data 730.

Figure 7D:
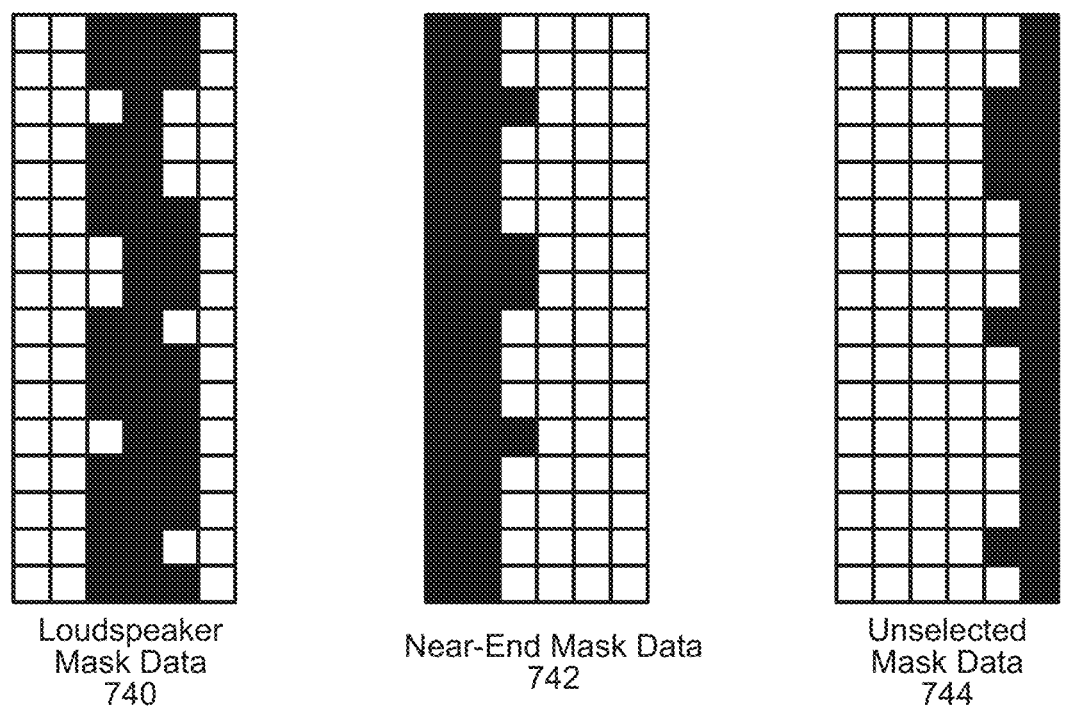

In other examples, the device 110 may select the first frequency bands that correspond to the loudspeaker(s) 114 using a first threshold value (e.g., selecting frequency bands associated with correlation values that exceed the first threshold value), select the second frequency bands that do not correspond to the loudspeaker(s) 114 using a second threshold value (e.g., selecting frequency bands associated with correlation values that are below the second threshold value), and leave third frequency bands unselected (e.g., frequency bands associated with correlation values higher than the second threshold value but lower than the first threshold value). For example, the device 110 may generate loudspeaker mask data indicating the first frequency bands and near-end mask data indicating the second frequency bands, with neither the loudspeaker mask data nor the near-end mask data indicating the third frequency bands. As illustrated in FIG. 7D, loudspeaker mask data 740 indicates the first frequency bands in black and both the second frequency bands and the third frequency bands in white, near-end mask data 742 indicates the second frequency bands in black and both the first frequency bands and the third frequency bands in white, and for illustrative purposes only, unselected mask data 744 indicates the third frequency bands in black and both the first frequency bands and the second frequency bands in white.

FIG. 8 illustrates a first example of binary gain values, a second example of multiple threshold values, and a third example of continuous gain values according to examples of the present disclosure. As illustrated in FIG. 8, the device 110 may generate loudspeaker mask data based on a correlation value between the microphone audio data and the playback audio data. As illustrated in mask chart 810, the device 110 may set a first binary value (e.g., value of 1) or a second binary value (e.g., value of 0) in the loudspeaker mask data based on a first threshold value (e.g., loudspeaker threshold value $Th_L$). For example, the device 110 may determine that a first time-frequency band of the microphone audio data is strongly correlated with the first time-frequency band of the playback audio data (and therefore the loudspeaker(s) 114) when a first correlation value is above the loudspeaker threshold value $Th_L$. Similarly, the device 110 may determine that a second time-frequency band of the microphone audio data is weakly correlated with the second time-frequency band of the playback audio data when a second correlation value is below the loudspeaker threshold value $Th_L$. Thus, the loudspeaker mask data indicates only time-frequency bands associated with correlation values that exceed the loudspeaker threshold value $Th_L$.

While the mask chart 810 illustrates grouping the mask values into two bins (e.g., correlation values below the first threshold value correspond to a gain value of zero and correlation values above the first threshold value correspond to a gain value of one), the disclosure is not limited thereto. Instead, the device 110 may group the correlation values into three or more bins using two or more threshold values without departing from the disclosure. For example, three bins may correspond to gain values of 0, 0.5 and 1; five bins may correspond to gain values of 0, 0.25, 0.5, 0.75 and 1; and so on.

Additionally or alternatively, the device 110 may generate near-end mask data based on the correlation value between the microphone audio data and the playback audio data. As illustrated in mask chart 820, the device 110 may generate the loudspeaker mask data using the first threshold value, as described above with regard to mask chart 810. In addition, the device 110 may set a first binary value (e.g., value of 1) or a second binary value (e.g., value of 0) in the near-end mask data based on a second threshold value (e.g., near-end threshold value $Th_{NE}$). For example, the device 110 may determine that the first time-frequency band of the microphone audio data is weakly correlated with the near-end audio when the first correlation value is above the near-end threshold value $Th_{NE}$. Similarly, the device 110 may determine that the second time-frequency band of the microphone audio data is strongly correlated with the near-end audio when the second correlation value is below the near-end threshold value $Th_{NE}$. Thus, the near-end mask data indicates only time-frequency bands associated with correlation values that are below the near-end threshold value $Th_{NE}$.

The examples described above refer to generating the loudspeaker mask data using binary values. For example, the device 110 may determine the first frequency band(s) associated with the loudspeaker(s) 114 and/or the second frequency bands associated with the near-end audio. Thus, an individual frequency band or time-frequency unit is associated with either the loudspeaker(s) 114 (e.g., mask value equal to a first binary value, such as 1) or not (e.g., mask value equal to a second binary value, such as 0) in the loudspeaker mask data 730/740. Similarly, an individual frequency band or time-frequency unit is associated either with the near-end audio (e.g., mask value equal to a first binary value, such as 1) or not (e.g., mask value equal to a second binary value, such as 0) in the near-end mask data 732/742.

However, the disclosure is not limited thereto and the loudspeaker mask data may correspond to continuous values. For example, the loudspeaker mask data may include continuous values, with black representing a mask value of one (e.g., high likelihood that the playback audio data is detected), white representing a mask value of zero (e.g., low likelihood that the playback audio data is detected), and varying shades of gray representing intermediate mask values between zero and one (e.g., specific confidence level corresponding to a likelihood that the playback audio data is detected). Additionally or alternatively, the continuous values of the loudspeaker mask data may indicate a correlation between the microphone audio data and the playback audio data and/or a percentage of the microphone audio data that corresponds to the playback audio data for each time-frequency unit without departing from the disclosure. For example, the loudspeaker mask data may include continuous values, with black representing a mask value of one (e.g., high correlation between the playback audio data and the microphone audio data), white representing a mask value of zero (e.g., low correlation between the playback audio data and the microphone audio data), and varying shades of gray representing intermediate mask values between zero and one (e.g., specific correlation values between the playback audio data and the microphone audio data). As illustrated in FIG. 8, mask chart 830 represents an example in which the device 110 generates continuous values for the loudspeaker mask data by setting a loudspeaker mask value equal to a correlation value, although the disclosure is not limited thereto.

FIG. 9 illustrates an example of generating reference audio data using loudspeaker mask data according to examples of the present disclosure. In some examples, the device 110 may apply the loudspeaker mask data to the microphone audio data to generate reference audio data that can be used to perform acoustic echo cancellation (AEC). As illustrated in FIG. 9, microphone audio data 910 and playback audio data 912 may be input to a mask estimator 920, which may compare the playback audio data 912 to the microphone audio data 910 and generate loudspeaker mask data 922. This process is described in greater detail above with regard to FIG. 6.

The loudspeaker mask data 922 and the microphone audio data 910 may be input to a reference generator 930 to generate reference audio data 932. For example, the reference generator 930 may apply the loudspeaker mask data 922 to the microphone audio data 910 to generate the reference audio data 932. When the loudspeaker mask data 922 corresponds to binary values, the device 110 may generate the reference audio data 932 by multiplying the loudspeaker mask data 922 by one or more channels of the microphone audio data 910. For example, the device 110 may pass the first frequency bands in the microphone audio data 910 (e.g., apply a gain value of 1), while suppressing the second frequency bands and the third frequency bands in the microphone audio data 910 (e.g., attenuating by applying a gain value of 0). Thus, the reference audio data 932 generated using binary values in the loudspeaker mask data 922 only includes the time-frequency bands associated with high correlation values that exceed the first threshold value.

When the loudspeaker mask data 922 corresponds to continuous values, the device 110 may generate the reference audio data 932 by multiplying the loudspeaker mask data 922 by the microphone audio data 910. For example, the device 110 may determine an amount of attenuation based on the correlation value associated with a time-frequency band. To illustrate an example, the device 110 may pass a majority of the first frequency bands in the microphone audio data 910 (e.g., apply a gain value close to 1), suppress a majority of the second frequency bands in the microphone audio data 910 (e.g., attenuating by applying a gain value close to 0), and pass a percentage of the third frequency bands in the microphone audio data 910 based on the correlation values (e.g., applying a gain value between 0 and 1). Thus, the reference audio data 932 generated using continuous values in the loudspeaker mask data 922 includes a portion of every time-frequency band in the microphone audio data 910, with larger gain values (e.g., less attenuation) applied to time-frequency bands in the microphone audio data 910 that are strongly correlated to the playback audio data 912 and smaller gain values (e.g., more attenuation) applied to time-frequency bands in the microphone audio data 910 that are weakly correlated to the playback audio data 912.

As illustrated in FIG. 9, the microphone audio data 910 may be represented as a first audio waveform 914 that includes audio data corresponding to a number of sources, such as the first user 10, a second user (not shown), the loudspeaker(s) 114, acoustic noise, and so on. Thus, the first audio waveform 914 includes a lot of activity. The mask estimator 920 may generate the loudspeaker mask data 922, which may be represented as a time-frequency map 924 (e.g., binary mask) indicating first frequency bands associated with the playback audio data (e.g., echo signal y(t) generated by the loudspeaker(s) 114). Using the loudspeaker mask data 922, the reference generator 930 may generate reference audio data 932 corresponding to loudspeaker(s) 114. As illustrated in FIG. 9, the reference audio data 932 may be represented as a second audio waveform 934 that only includes audio data associated with the loudspeaker(s) 114, with remaining portions of the microphone audio data 910 represented in the first audio waveform 914 (e.g., near-end audio corresponding to audio data associated with the first user 10, the second user, the acoustic noise, etc.) removed. Thus, by applying the loudspeaker mask data 922 to the microphone audio data 910, the reference generator 930 selects only a portion of the microphone audio data 910 that is associated with the playback audio data 912 and the loudspeaker(s) 114. Therefore, the reference audio data 932 only corresponds to the echo signal y(t) associated with the loudspeaker(s) 114 and may be used as a reference signal for echo cancellation.

Figure 10A:
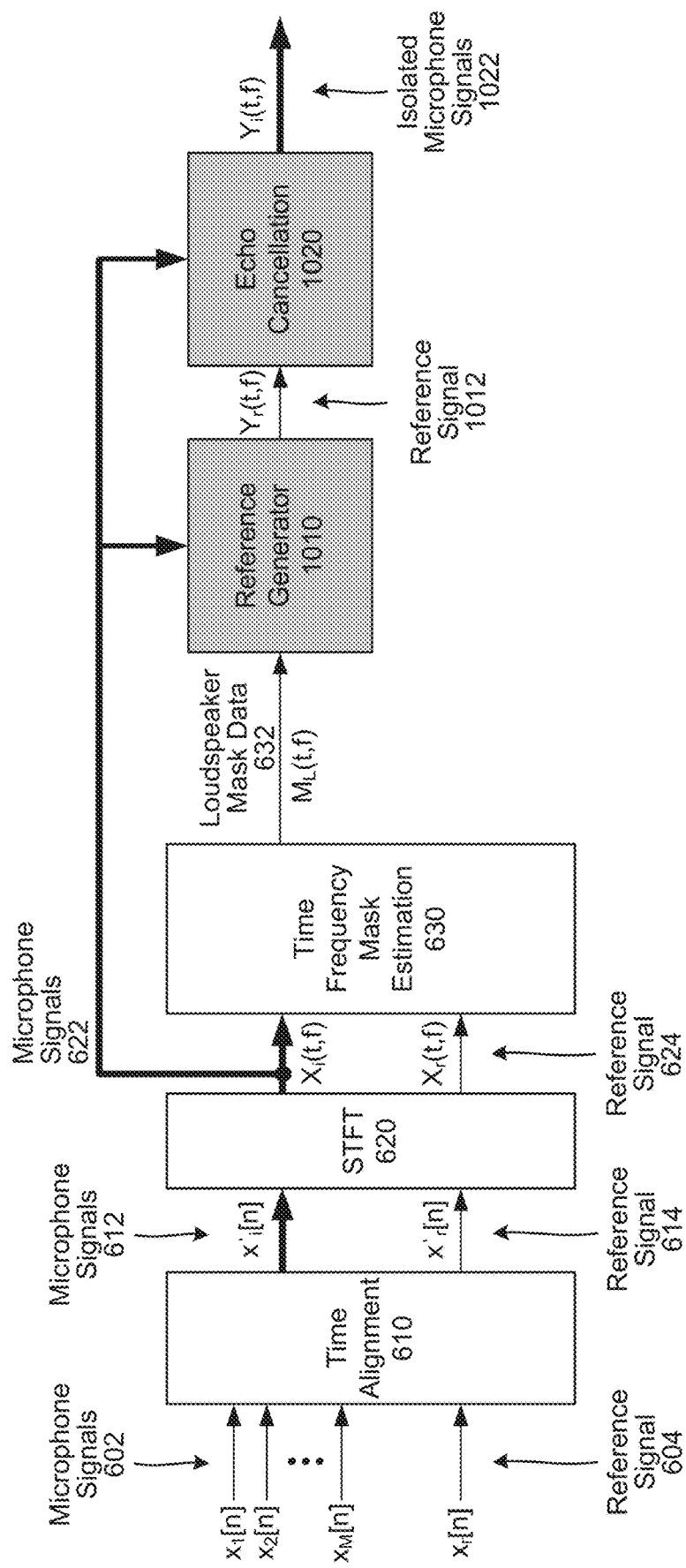

FIG. 10A illustrates an example of generating isolated audio data using mask data according to examples of the present disclosure. As illustrated in FIG. 10A, the time frequency mask estimation component 630 may generate loudspeaker mask data $M_L(t,f)$ 632, as described above with regard to FIG. 6. The loudspeaker mask data $M_L(t,f)$ 632 may be input to a reference generator 1010, which may apply the loudspeaker mask data $M_L(t,f)$ 632 to at least one of the microphone signals $X_i(t,f)$ 622 to generate a reference signal $Y_r(t,f)$ 1012. As discussed above, by applying the loudspeaker mask data $M_L(t,f)$ 632 to the microphone signals $X_i(t,f)$ 622, the reference generator 1010 selects only a portion of the microphone signals $X_i(t,f)$ 622 that is associated with the reference signal $x_r(n)$ 604 (e.g., playback audio data) and the loudspeaker(s) 114. Therefore, the reference signal $Y_r(t,f)$ 1012 only corresponds to the echo signal y(t) associated with the loudspeaker(s) 114 and may be used as a reference signal for echo cancellation, as the reference signal $Y_r(t,f)$ 1012 is precisely time-aligned with the other microphone signals $X_i(t,f)$ 622.

As illustrated in FIG. 10A, the reference signal $Y_r(t,f)$ 1012 and the microphone signals $X_i(t,f)$ 622 may be input to an echo cancellation component 1020 (e.g., acoustic echo cancellation (AEC), adaptive interference cancellation (AIC), or the like) to generate isolated microphone signals $Y_i(t,f)$ 1022. For example, the echo cancellation component 1020 may subtract the reference signal $Y_r(t,f)$ 1012 from a first microphone signal $X_1(t,f)$ 622a to generate a first isolated microphone signal $Y_1(t,f)$ 1022a associated with a first microphone 112a, may subtract the reference signal $Y_r(t,f)$ 1012 from a second microphone signal $X_2(t,f)$ 622b to generate a second isolated microphone signal $Y_2(t,f)$ 1022b associated with a second microphone 112b, and so on for each of the microphone(s) 112.

While the example illustrated in FIG. 10A refers to the device 110 generating the reference signal $Y_r(t,f)$ 1012 based only on the loudspeaker mask data $M_L(t,f)$ 632, the disclosure is not limited thereto and the device 110 may generate a reference signal based on the loudspeaker mask data $M_L(t,f)$ 632 and the near-end mask data $M_{NE}(t,f)$ 634 without departing from the disclosure.

Figure 10B:
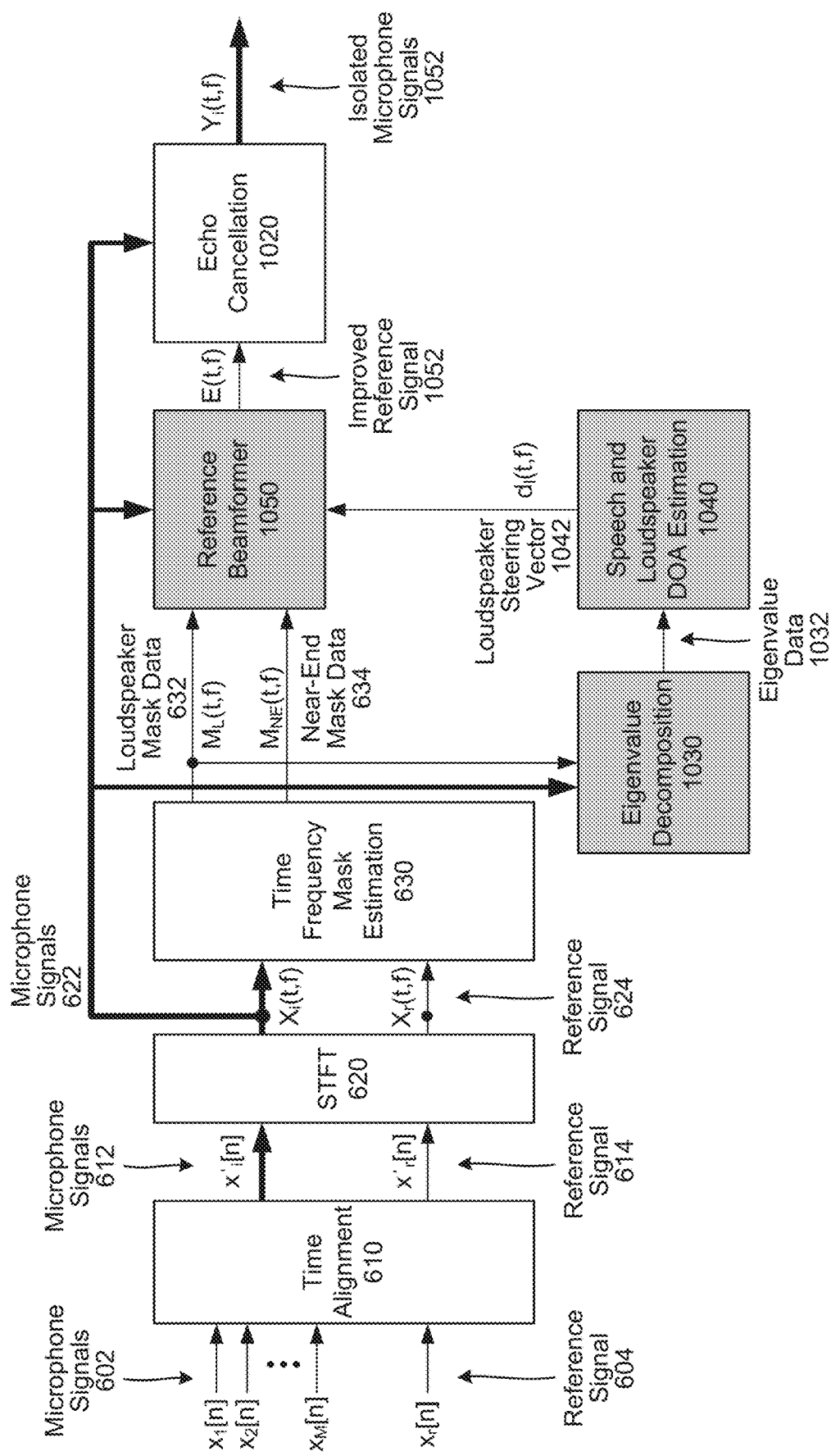

FIGS. 10B-10C illustrate example of generating isolated audio data using mask data according to examples of the present disclosure. As illustrated in FIG. 10B, the time frequency mask estimation component 630 may generate loudspeaker mask data $M_L(t,f)$ 632 and near-end mask data $M_{NE}(t,f)$ 634, as described above with regard to FIG. 6. The loudspeaker mask data $M_L(t,f)$ 632 and the near-end mask data $M_{NE}(t,f)$ 634 may be input to a reference beamformer 1050 to generate an improved reference signal $E(t,f)$ 1052. For example, a loudspeaker signal's cross-PSD signal $\sigma_{PP}(t,f)$ may be estimated based on the microphone signals $X_i(t,f)$ 622 and the loudspeaker mask data $M_L(t,f)$ 632 using the following equation:

$$\sigma_{PP}(t,f) = YY^H M_L(t,f) \quad [2]$$

where $\sigma_{PP}(t,f)$ is the cross-PSD signal associated with the loudspeaker(s) 114, $YY^H$ is the microphone signals $X_i(t,f)$ 622 stacked in the frequency domain, and $M_L(t,f)$ is the loudspeaker mask data $M_L(t,f)$ 632.

Similarly, the near-end cross-PSD signal $\sigma_{NN}(t,f)$ may be estimated based on the microphone signals $X_i(t,f)$ 622 and the near-end mask data $M_{NE}(t,f)$ 634 using the following equation:

$$\sigma_{NN}(t,f) = YY^H M_{NE}(t,f) \quad [3]$$

where $\sigma_{NN}(t,f)$ is the cross-PSD signal associated with the near-end audio, $YY^H$ is the microphone signals $X_i(t,f)$ 622 stacked in the frequency domain, and $M_{NE}(t,f)$ is the near-end mask data $M_{NE}(t,f)$ 634.

In order for the reference beamformer 1050 to generate the improved reference signal $E(t,f)$ 1052, the device 110 may determine a loudspeaker steering vector $d_l(t,f)$ 1042 based on the loudspeaker cross-PSD signal $\sigma_{PP}(t,f)$. For example, the device 110 may input the loudspeaker mask data $M_L(t,f)$ 632 and the microphone signals $X_i(t,f)$ 622 to an eigenvalue decomposition component 1030, which may generate eigenvalue data 1032. The eigenvalue decomposition component 1030 may use a power spectral density of the mask signal (e.g., masked power spectral density of the reference signal) to generate the eivenvalue data 1032. In some examples, the eigenvalue data 1032 may correspond to a principal eigen vector of the loudspeaker cross-PSD signal $\sigma_{PP}(t,f)$, although the disclosure is not limited thereto.

The eigenvalue data 1032 may be input to a speech and loudspeaker direction of arrival (DOA) estimation component 1040, which may determine a loudspeaker steering vector $d_l(t,f)$ 1042. The loudspeaker steering vector $d_l(t,f)$ 1042 is directed towards the loudspeaker(s) 114 and may be input to the reference beamformer 1050.

To generate the improved reference signal $E(t,f)$ 1052, the reference beamformer component 1050 may calculate a new estimate of the loudspeaker signal using the following equation:

$$\hat{\sigma}_{PP}(t,f) = \frac{\sigma_{NN}^{-1}(t,f)d_l(t,f)}{d_l^H(t,f)\sigma_{NN}^{-1}(t,f)d_l(t,f)} \quad [4]$$

where $\sigma_{PP}(t,f)$ is the cross-PSD signal associated with the loudspeaker(s) 114 (e.g., improved reference signal $E(t,f)$ 1052), $\sigma_{NN}$ f is the cross-PSD signal associated with the near-end audio, and $d_l(t,f)$ is the loudspeaker steering vector $d_l(t,f)$ 1042.

As illustrated in FIG. 10B, the improved reference signal $E(t,f)$ 1052 and the microphone signals $X_i(t,f)$ 622 may be input to an echo cancellation component 1020 (e.g., acoustic echo cancellation (AEC), adaptive interference cancellation (AIC), or the like) to generate isolated microphone signals $Y_i(t,f)$ 1052. For example, the echo cancellation component 1020 may subtract the improved reference signal $E(t,f)$ 1052 from a first microphone signal $X_1(t,f)$ 622a to generate a first isolated microphone signal $Y_1(t,f)$ 1052a associated with a first microphone 112a, may subtract the improved reference signal $E(t,f)$ 1052 from a second microphone signal $X_2(t,f)$ 652b to generate a second isolated microphone signal $Y_2(t,f)$ 1022b associated with a second microphone 112b, and so on for each of the microphone(s) 112.

FIG. 10C illustrates an example of generating the improved reference signal $E(t,f)$ 1052. As illustrated in FIG. 10C, the device 110 may input the loudspeaker mask data 632 and the microphone signals $X_i(t,f)$ 622 to loudspeaker cross-PSD estimation component 1060, which may calculate the loudspeaker cross-PSD signal $\sigma_{PP}(t,f)$ 1062 using Equation (2) above. The loudspeaker cross-PSD signal $\sigma_{PP}(t,f)$ 1062 may be input into a loudspeaker steering vector estimation component 1070, which may generate loudspeaker steering vector $d_l(t,f)$ 1072. In addition, the device 110 may input the near-end mask data 634 and the microphone signals $X_i(t,f)$ 622 to the near-end cross-PSD estimation component 1080, which may calculate the near-end cross-PSD signal $\sigma_{NN}(t,f)$ 1082 using Equation (3) above. Finally, the enhanced loudspeaker cross-PSD estimation component 1090 may receive the microphone signals $X_i(t,f)$ 622, the loudspeaker steering vector $d_l(t,f)$ 1072, and the near-end cross-PSD signal $\sigma_{NN}(t,f)$ 1082 and may generate the improved reference signal 1052 using Equation (4) above.

Figure 11:
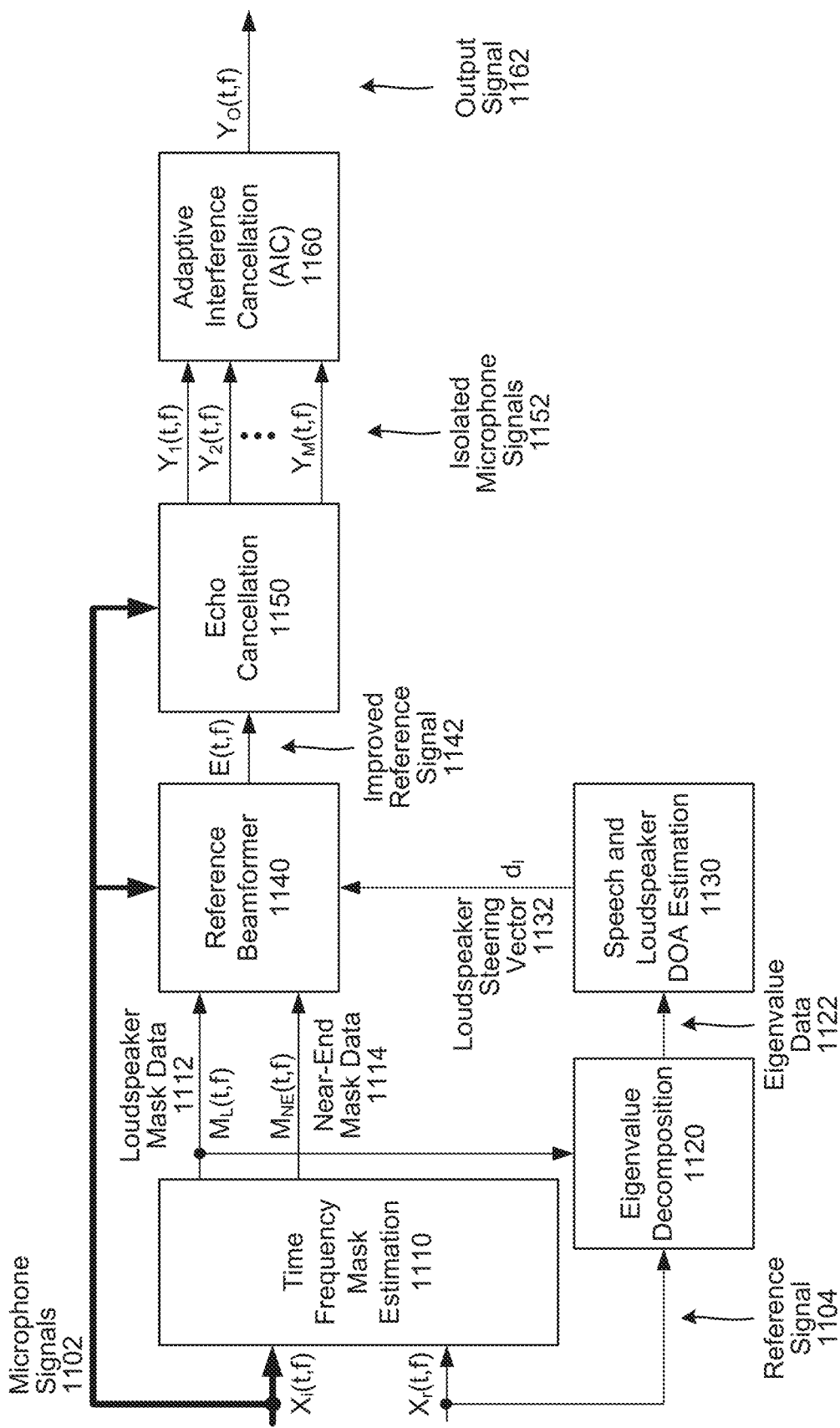
FIG. 11 illustrates an example of generating output audio data using adaptive interference cancellation according to examples of the present disclosure.

FIG. 11 illustrates an example of generating output audio data using adaptive interference cancellation according to examples of the present disclosure. As FIG. 11 illustrates components similar to those described above with regard to FIG. 10B, a corresponding description is omitted. As illustrated in FIG. 11, a reference beamformer 1140 may generate an improved reference signal 1142, which may be used by echo cancellation component 1150 to perform echo cancellation. For example, the echo cancellation component 1150 may subtract the improved reference signal 1142 from each of the microphone signals 1102 to generate isolated microphone signals 1152.

After generating the isolated microphone signals 1152, the device 110 may perform adaptive interference cancellation (AIC) processing using an AIC component 1160. For example, the AIC component 1160 may select one of the isolated microphone signals 1152 as a target signal and select one of the isolated microphone signals 1152 as a reference signal and may generate output signal 1162 by subtracting the reference signal from the target signal.

Figure 12A:
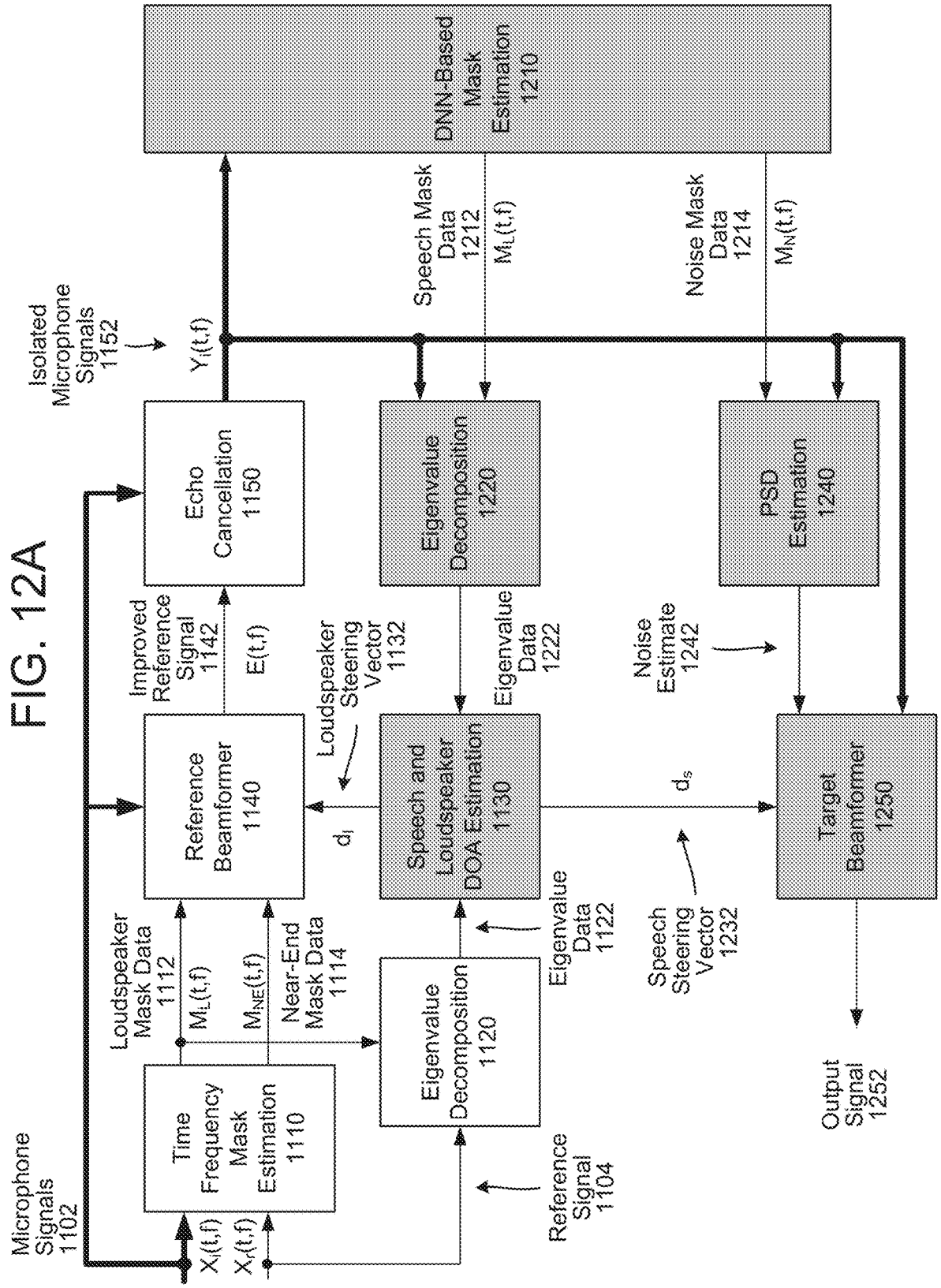
FIGS. 12A-12C illustrate examples of generating audio data using a beamformer according to examples of the present disclosure.
Figure 12B:
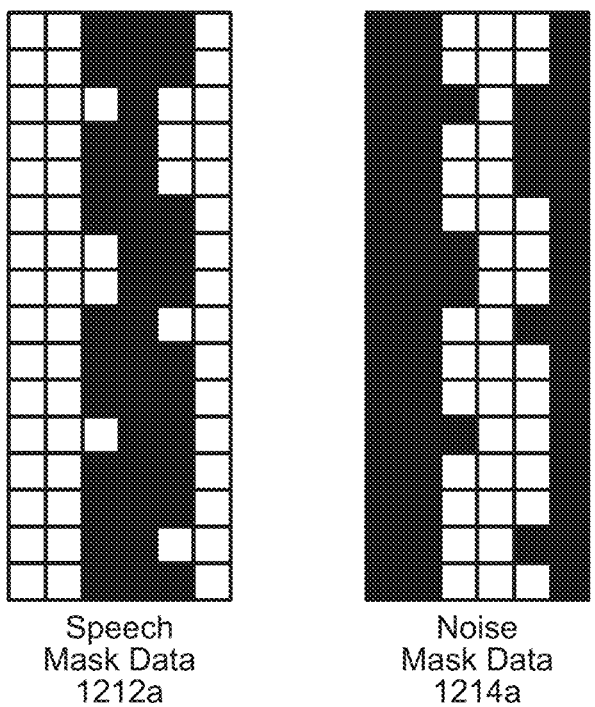
Figure 12C:
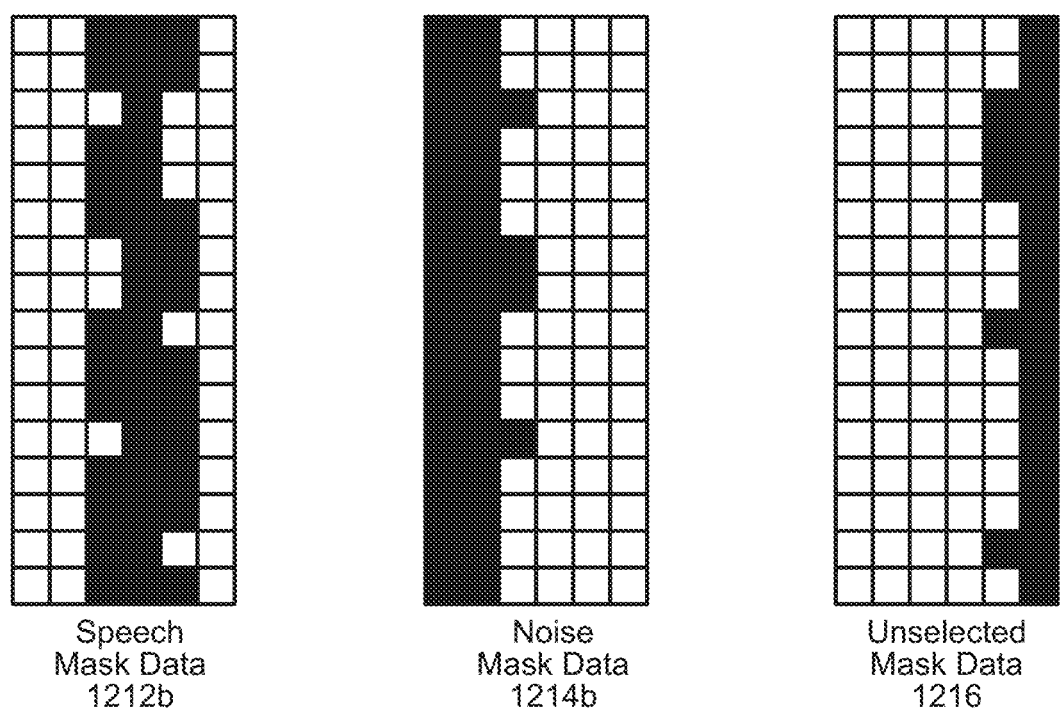

FIGS. 12A-12C illustrate examples of generating audio data using a beamformer according to examples of the present disclosure. As illustrated in FIG. 12A, in some examples the device 110 may include additional components, such as DNN-based mask estimation component 1210 and a target beamformer 1250 and may generate an improved output signal by performing beamforming using the isolated microphone signals 1152. Thus, instead of selecting a single isolated microphone signal 1152 as a target signal and a second isolated microphone signal 1152 as a reference signal, the device 110 may perform beamforming to beamform the isolated microphone signals 1152 towards the desired speech source, resulting in improvements in the output signal.

As illustrated in FIG. 12A, the isolated microphone signals 1152 may be input into a deep neural network (DNN) based mask estimation component 1210 that may analyze the isolated microphone signals 1152 and generate speech mask data 1212 and noise mask data 1214. The speech mask data 1212 and the noise mask data 1214 may be similar to the mask data generated by the time frequency mask estimation, although the disclosure is not limited thereto. The speech mask data 1212 and the isolated microphone signals 1152 may be input to eigenvalue decomposition component 1220, which may generate eigenvalue data 1222 using the same techniques described above with regard to the eigenvalue decomposition component 1120.

The eigenvalue data 1222 may be input to speech and loudspeaker DOA estimation component 1130, which may use the eigenvalue data 1222 to generate speech steering vector 1232 (e.g., steering vector towards the desired talker). While FIG. 12A illustrates a single component generating both the loudspeaker steering vector 1132 and the speech steering vector 1232, the disclosure is not limited thereto. In some examples these steering vectors may be generated using a single component in order to ensure that the loudspeaker steering vector 1132 is different from the speech steering vector 1232 (e.g., both steering vectors do not point in the same direction). However, the disclosure is not limited thereto and two separate components may generate the loudspeaker steering vector 1132 and the speech steering vector 1232 without departing from the disclosure.

In addition, the device 110 may send the isolated microphone signals 1152 and the noise mask data 1214 to power spectral density (PSD) estimation component 1240, which may generate a noise estimate 1242. The isolated microphone signals 1152, the noise estimate 1242, and the speech steering vector 1232 may be input to target beamformer 1250 to generate an output signal 1252. For example, the target beamformer 1250 may perform the same steps described above with regard to the reference beamformer 1140, although the disclosure is not limited thereto.

FIGS. 12B-12C illustrate examples of the speech mask data 1212 and the noise mask data 1214. As illustrated in FIG. 12B, the device 110 may associate each frequency band with a category. For example, the device 110 may generate first speech mask data 1212a associated with a user and first noise mask data 1214a associated with ambient noise in an environment around the device 110 (which may include playback audio generated by the loudspeaker(s) 114). As every frequency band is associated with a binary mask, FIG. 12B illustrates that each frequency band is associated with either the first speech mask data 1212a or the first noise mask data 1214a.

In some examples, the device 110 may divide every frequency band into either first frequency bands (e.g., frequency bands that correspond to the speech) or second frequency bands (e.g., frequency bands that do not correspond to the speech). For example, the device 110 may generate speech mask data indicating the first frequency bands and noise mask data indicating the second frequency bands. As illustrated in FIG. 12B, first speech mask data 1212a indicates the first frequency bands in black and the second frequency bands in white, while first noise mask data 1214a indicates the second frequency bands in black and the first frequency bands in white. If the device 110 generates the first speech mask data 1212a as binary mask data (e.g., values of zero or one), each time-frequency band may correspond to either the first speech mask data 1212a or the first noise mask data 1214a (e.g., non-speech mask data). Thus, the device 110 may determine the first frequency bands using the first speech mask data 1212a and/or determine the second frequency bands based on the first noise mask data 1214a or an inverse of the first speech mask data 1212a.

However, the disclosure is not limited thereto and in some examples, frequency bands do not need to be associated with any mask (e.g., a frequency band may have a value of zero for all mask data). For example, FIG. 12C illustrates three masks; second speech mask data 1212b associated with the first user 5, second noise mask data 1214b associated with ambient noise in an environment around the device 110 (which may include playback audio generated by the loudspeaker(s) 114), and unselected mask data 1216. As illustrated in FIG. 12C, some frequency bands (e.g., entire right-most column) are not associated with either the speech mask data 1212 or the noise mask data 1214 without departing from the disclosure.

Thus, the device 110 may associate the first frequency bands with speech, associate the second frequency bands with noise, and leave third frequency bands unselected (e.g., frequency bands not associated with the speech or the noise). For example, the device 110 may generate speech mask data indicating the first frequency bands and noise mask data indicating the second frequency bands, with neither the speech mask data nor the noise mask data indicating the third frequency bands. As illustrated in FIG. 12C, second speech mask data 1212b indicates the first frequency bands in black and both the second frequency bands and the third frequency bands in white, second noise mask data 1214b indicates the second frequency bands in black and both the first frequency bands and the third frequency bands in white, and for illustrative purposes only, unselected mask data 1216 indicates the third frequency bands in black and both the first frequency bands and the second frequency bands in white.

To generate the speech mask data 1212 and the noise mask data 1214, the DNN-based mask estimation component 1210 may analyze the isolated microphone signals 1152 over time to determine which frequency bands and frame indexes correspond to a desired classification. For example, the DNN-based mask estimation component 1210 may generate a binary mask indicating frequency bands that correspond to speech, with a value of 0 (e.g., white) indicating that the frequency band does not correspond to speech and a value of 1 (e.g., black) indicating that the frequency band does correspond to speech.

While FIGS. 12B-12C illustrate binary masks, the disclosure is not limited thereto and the mask data generated by the DNNs may correspond to continuous values, with black representing a mask value of one (e.g., high likelihood that speech is detected), white representing a mask value of zero (e.g., low likelihood that speech is detected), and varying shades of gray representing intermediate mask values between zero and one (e.g., specific confidence level corresponding to a likelihood that speech is detected).

FIG. 13 illustrates an example of performing adaptive interference cancellation using output signals generated by the beamformer according to examples of the present disclosure. In some examples, the device 110 may perform adaptive interference cancellation using the improved reference signal 1142 generated by the reference beamformer component 1140, which is described in greater detail above with regard to FIG. 11, and the output signal 1252 generated by the target beamformer component 1250, which is described in greater detail above with regard to FIG. 12A. Thus, the improved reference signal 1142 may be used to cancel echo from the microphone signals 1102 to generate isolated microphone signals 1152 as well as to cancel echo from the output signal 1252 generated using the isolated microphone signals 1152.

As illustrated in FIG. 13, an AIC component 1310 may receive the output signal 1252 as a target signal and the improved reference signal 1142 as a reference signal and may perform AIC processing to subtract the improved reference signal 1142 from the output signal 1252 to generate isolated output signal 1312.

While the examples illustrated above refer to the time frequency mask estimation 630 receiving a playback signal corresponding to playback audio data sent to the loudspeaker(s) 114, the disclosure is not limited thereto. Instead, in some examples the time frequency mask estimation 630 may associate one or more first microphone signals and/or beamformed signals with a target signal and associate one or more second microphone signals and/or beamformed signals with a reference signal and perform the same processing described above. For example, the device 110 may determine that certain microphone(s) 112 and/or certain directions are associated with a reference and may select microphone signal(s) and/or beamformed signal(s) associated with these microphone(s) and/or direction(s) as the reference signal.

Figure 14A:
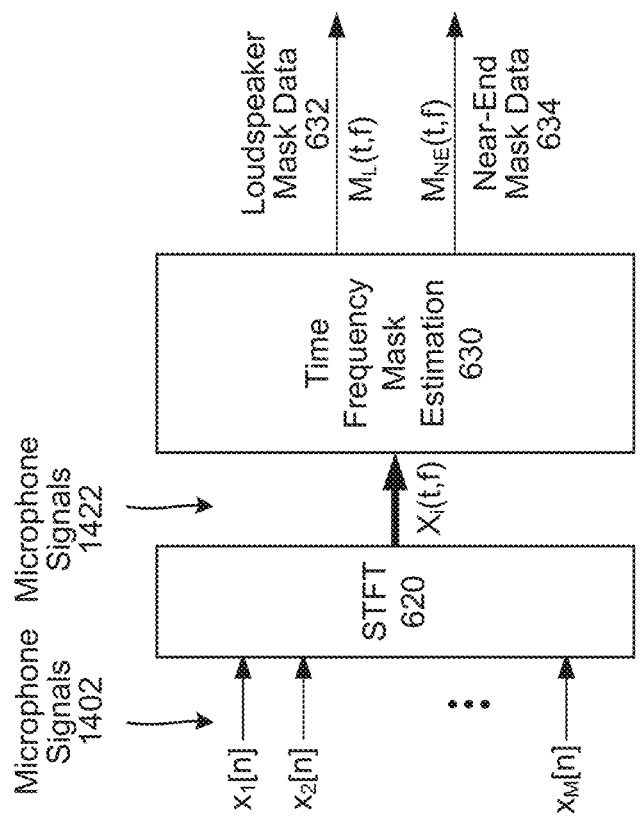
FIGS. 14A-14C illustrate examples of performing beamforming without playback audio data according to examples of the present disclosure.
Figure 14B:
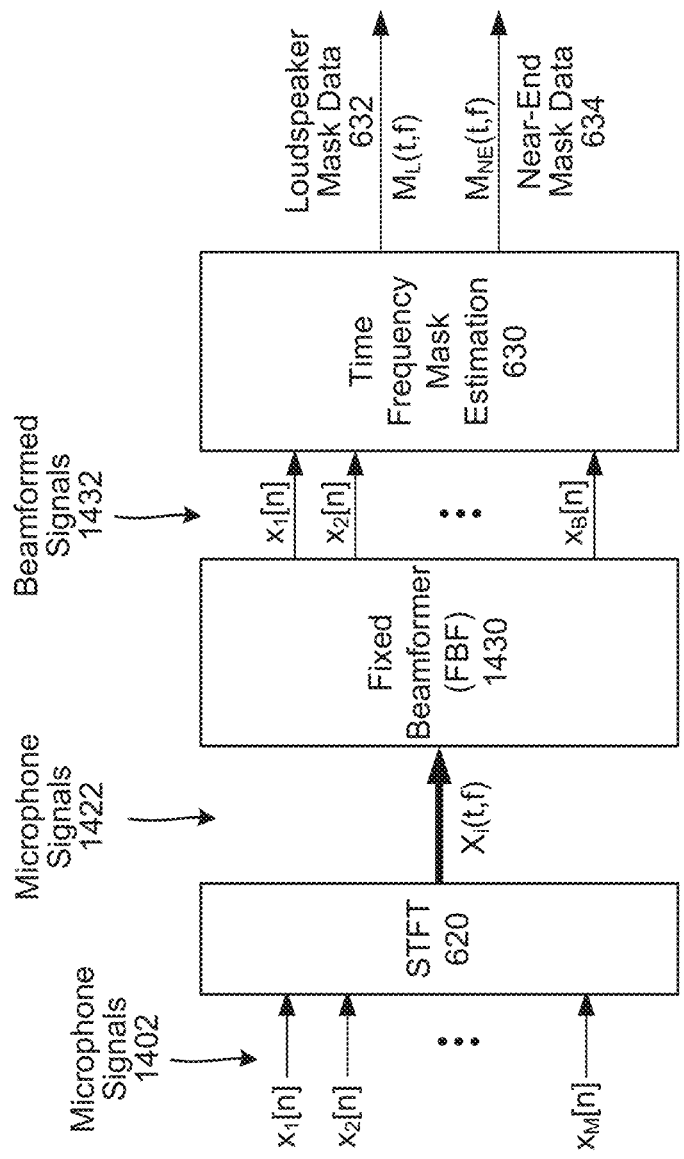
Figure 14C:
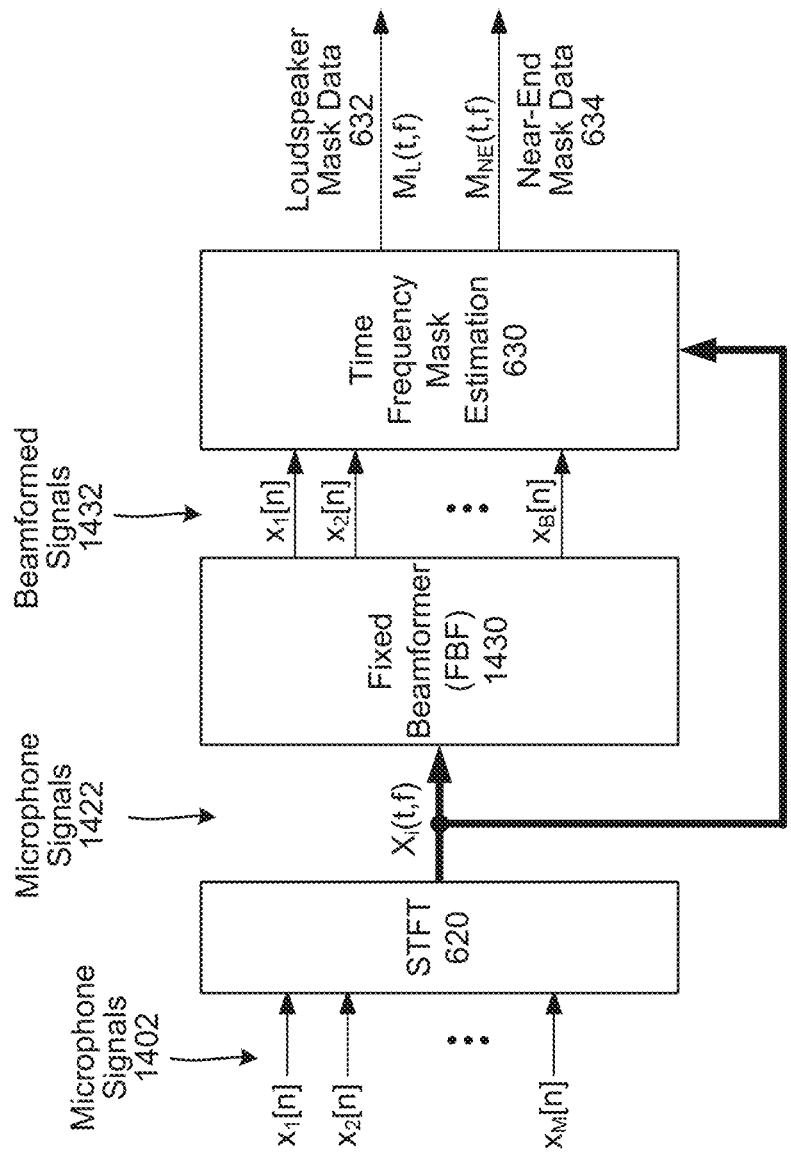

FIGS. 14A-14C illustrate examples of performing mask estimation without playback audio data according to examples of the present disclosure. For ease of illustration, FIGS. 14A-14C illustrate only the input stage, up to the time frequency mask estimation component 630. The output of the time frequency mask estimation component 630 may be used in a variety of ways, as described in greater detail above. In contrast to the component diagram illustrated in FIG. 6, the time frequency mask estimation component 630 illustrated in FIGS. 14A-14C doesn't receive a reference signal (e.g., reference signal 624) based on playback audio data.

FIG. 14A illustrates an example of performing mask estimation using microphone signals as a reference signal. As illustrated in FIG. 14A, microphone signals 1402 may be input to the STFT component 620 to generate microphone signals 1422, as described in greater detail above. The microphone signals 1422 may be input to the time frequency mask estimation component 630 and the time frequency mask estimation component 630 may generate loudspeaker mask data 632 and/or near-end mask data 634 using the techniques described above. In some examples, the time frequency mask estimation component 630 may select a portion of the microphone signals 1422 as a reference signal and/or generate a reference signal. However, the disclosure is not limited thereto, and in other examples the time frequency mask estimation component 630 may receive an explicit indication of the reference signal (e.g., first portion of the microphone signals 1422 is input as a target signal, second portion of the microphone signals 1422 is input as a reference signal). While this is not illustrated in FIG. 14A, the device 110 may include additional components that determine and/or select the reference signal without departing from the disclosure.

FIG. 14B illustrates an example of performing mask estimation using beamformed signals as a reference signal. As illustrated in FIG. 14B, microphone signals 1402 may be input to the STFT component 620 to generate microphone signals 1422, as described in greater detail above. The microphone signals 1422 may be input to a fixed beamformer (FBF) component 1430, which may generate beamformed signals 1432 corresponding to a plurality of directions. For example, the beamformed signals 1432 may include B number of audio signals, with B being a natural number corresponding to the number of beams generated by the FBF component 1430. The number of beams may exceed the number of microphones, although the disclosure is not limited thereto.

The FBF component 1430 may input the beamformed signals 1432 to the time frequency mask estimation component 630 and the time frequency mask estimation component 630 may generate loudspeaker mask data 632 and/or near-end mask data 634 using the techniques described above. In some examples, the time frequency mask estimation component 630 may select a portion of the beamformed signals 1432 as a reference signal and/or generate a reference signal. However, the disclosure is not limited thereto, and in other examples the time frequency mask estimation component 630 may receive an explicit indication of the reference signal (e.g., first portion of the beamformed signals 1432 is input as a target signal, second portion of the beamformed signals 1432 is input as a reference signal). While this is not illustrated in FIG. 14B, the device 110 may include additional components that determine and/or select the reference signal without departing from the disclosure.

FIG. 14C illustrates an example of performing mask estimation using a combination of microphone signals and beamformed signals as a reference signal. As illustrated in FIG. 14C, the STFT component 620 may input at least a portion of the microphone signals 1422 to the time frequency mask estimation component 630 and the FBF component 1430 may input the beamformed signals 1432 to the time frequency mask estimation component 630. Based on a combination of the microphone signals 1422 and the beamformed signals 1432, the time frequency mask estimation component 630 may generate loudspeaker mask data 632 and/or near-end mask data 634 using the techniques described above.

FIG. 15 is a block diagram conceptually illustrating example components of a system \ according to embodiments of the present disclosure. In operation, the system 100 may include computer-readable and computer-executable instructions that reside on the device 110, as will be discussed further below.

The device 110 may include one or more audio capture device(s), such as a microphone array which may include one or more microphones 112. The audio capture device(s) may be integrated into a single device or may be separate. The device 110 may also include an audio output device for producing sound, such as loudspeaker(s) 116. The audio output device may be integrated into a single device or may be separate.

As illustrated in FIG. 15, the device 110 may include an address/data bus 1524 for conveying data among components of the device 110. Each component within the device 110 may also be directly connected to other components in addition to (or instead of) being connected to other components across the bus 1524.

The device 110 may include one or more controllers/processors 1504, which may each include a central processing unit (CPU) for processing data and computer-readable instructions, and a memory 1506 for storing data and instructions. The memory 1506 may include volatile random access memory (RAM), non-volatile read only memory (ROM), non-volatile magnetoresistive (MRAM) and/or other types of memory. The device 110 may also include a data storage component 1508, for storing data and controller/processor-executable instructions (e.g., instructions to perform operations discussed herein). The data storage component 1508 may include one or more non-volatile storage types such as magnetic storage, optical storage, solid-state storage, etc. The device 110 may also be connected to removable or external non-volatile memory and/or storage (such as a removable memory card, memory key drive, networked storage, etc.) through the input/output device interfaces 1502.

The device 110 includes input/output device interfaces 1502. A variety of components may be connected through the input/output device interfaces 1502. For example, the device 110 may include one or more microphone(s) 112 (e.g., a plurality of microphone(s) 112 in a microphone array), one or more loudspeaker(s) 114, and/or a media source such as a digital media player (not illustrated) that connect through the input/output device interfaces 1502, although the disclosure is not limited thereto. Instead, the number of microphone(s) 112 and/or the number of loudspeaker(s) 114 may vary without departing from the disclosure. In some examples, the microphone(s) 112 and/or loudspeaker(s) 114 may be external to the device 110, although the disclosure is not limited thereto. The input/output interfaces 1502 may include A/D converters (not illustrated) and/or D/A converters (not illustrated).

The input/output device interfaces 1502 may also include an interface for an external peripheral device connection such as universal serial bus (USB), FireWire, Thunderbolt, Ethernet port or other connection protocol that may connect to network(s) 199.

The input/output device interfaces 1502 may be configured to operate with network(s) 199, for example via an Ethernet port, a wireless local area network (WLAN) (such as WiFi), Bluetooth, ZigBee and/or wireless networks, such as a Long Term Evolution (LTE) network, WiMAX network, 3G network, etc. The network(s) 199 may include a local or private network or may include a wide network such as the internet. Devices may be connected to the network(s) 199 through either wired or wireless connections.

The device 110 may include components that may comprise processor-executable instructions stored in storage 1508 to be executed by controller(s)/processor(s) 1504 (e.g., software, firmware, hardware, or some combination thereof). For example, components of the device 110 may be part of a software application running in the foreground and/or background on the device 110. Some or all of the controllers/components of the device 110 may be executable instructions that may be embedded in hardware or firmware in addition to, or instead of, software. In one embodiment, the device 110 may operate using an Android operating system (such as Android 4.3 Jelly Bean, Android 4.4 KitKat or the like), an Amazon operating system (such as FireOS or the like), or any other suitable operating system.

Computer instructions for operating the device 110 and its various components may be executed by the controller(s)/processor(s) 1504, using the memory 1506 as temporary "working" storage at runtime. The computer instructions may be stored in a non-transitory manner in non-volatile memory 1506, storage 1508, or an external device. Alternatively, some or all of the executable instructions may be embedded in hardware or firmware in addition to or instead of software.

Multiple devices may be employed in a single device 110. In such a multi-device device, each of the devices may include different components for performing different aspects of the processes discussed above. The multiple devices may include overlapping components. The components listed in any of the figures herein are exemplary, and may be included a stand-alone device or may be included, in whole or in part, as a component of a larger device or system.

The concepts disclosed herein may be applied within a number of different devices and computer systems, including, for example, general-purpose computing systems, server-client computing systems, mainframe computing systems, telephone computing systems, laptop computers, cellular phones, personal digital assistants (PDAs), tablet computers, video capturing devices, wearable computing devices (watches, glasses, etc.), other mobile devices, video game consoles, speech processing systems, distributed computing environments, etc. Thus the components, components and/or processes described above may be combined or rearranged without departing from the ope of the present disclosure. The functionality of any component described above may be allocated among multiple components, or combined with a different component. As discussed above, any or all of the components may be embodied in one or more general-purpose microprocessors, or in one or more special-purpose digital signal processors or other dedicated microprocessing hardware. One or more components may also be embodied in software implemented by a processing unit. Further, one or more of the components may be omitted from the processes entirely.

The above embodiments of the present disclosure are meant to be illustrative. They were chosen to explain the principles and application of the disclosure and are not intended to be exhaustive or to limit the disclosure. Many modifications and variations of the disclosed embodiments may be apparent to those of skill in the art. Persons having ordinary skill in the field of computers and/or digital imaging should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk and/or other media. Some or all of the fixed beamformer, acoustic echo canceller (AEC), adaptive noise canceller (ANC) unit, residual echo suppression (RES), double-talk detector, etc. may be implemented by a digital signal processor (DSP).

Embodiments of the present disclosure may be performed in different forms of software, firmware and/or hardware. Further, the teachings of the disclosure may be performed by an application specific integrated circuit (ASIC), field programmable gate array (FPGA), or other component, for example.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Conjunctive language such as the phrase "at least one of X, Y and Z," unless specifically stated otherwise, is to be understood with the context as used in general to convey that an item, term, etc. may be either X, Y, or Z, or a combination thereof. Thus, such conjunctive language is not generally intended to imply that certain embodiments require at least one of X, at least one of Y and at least one of Z to each is present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method, the method comprising:
   receiving first audio data that includes a first representation of music, the first audio data being in a time domain;
   sending the first audio data to at least one loudspeaker to generate output audio;
   receiving second audio data generated by a microphone, the second audio data being in the time domain and including a second representation of the music and a first representation of speech;
   converting the first audio data from the time domain to a frequency domain to generate third audio data, the third audio data including a third representation of the music;
   converting the second audio data from the time domain to the frequency domain to generate fourth audio data, the fourth audio data including a fourth representation of the music and a second representation of the speech;
   determining a first correlation value indicating a correlation between a first portion of the third audio data and a first portion of the fourth audio data, wherein the first portion of the third audio data and the first portion of the fourth audio data are within a first frequency band;
   determining that the first correlation value exceeds a threshold value, indicating a strong correlation between the first portion of the third audio data and the first portion of the fourth audio data;
   setting a first value for a first portion of first mask data corresponding to the first frequency band;
   determining a second correlation value indicating a correlation between a second portion of the third audio data and a second portion of the fourth audio data, wherein the second portion of the third audio data and the second portion of the fourth audio data are within a second frequency band;
   determining that the second correlation value is below the threshold value, indicating a weak correlation between the second portion of the third audio data and the second portion of the fourth audio data;
   setting a second value for a second portion of the first mask data corresponding to the second frequency band;
   generating fifth audio data using the first mask data and the fourth audio data, the fifth audio data including a fifth representation of the music; and
   generating sixth audio data by subtracting the fifth audio data from the fourth audio data, the sixth audio data including a third representation of the speech.

2. The computer-implemented method of claim 1, further comprising:
   generating seventh audio data by multiplying the first mask data and the fourth audio data;
   estimating steering vector data using the seventh audio data, the steering vector data corresponding to a location of the at least one loudspeaker;
   determining second mask data using an inverse function of the first mask data;
   generating eighth audio data using the second mask data and the fourth audio data, the eighth audio data including a fourth representation of the speech; and
   generating the fifth audio data using the steering vector data and the eighth audio data.

3. The computer-implemented method of claim 1, further comprising:
   determining that the first correlation value exceeds a second threshold value, indicating that the first frequency band does not include speech;
   setting the second value for a first portion of second mask data;
   determining that the second correlation value is below the second threshold value, indicating that the second frequency band includes speech;
   setting the first value for a second portion of the second mask data; and
   generating the fifth audio data using the first mask data, the second mask data, and the fourth audio data.

4. The computer-implemented method of claim 1, wherein:
   generating the fifth audio data further comprises:
      estimating first steering vector data using the first mask data, the first steering vector data corresponding to a first location associated with the at least one loudspeaker; and
      generating the fifth audio data using the first steering vector data and the fourth audio data, and
   the method further comprises:
      processing the sixth audio data to generate second mask data corresponding to the speech;
      estimating second steering vector data using the second mask data, the second steering vector data corresponding to a second location associated with the speech; and
      generating seventh audio data using the second steering vector data and the sixth audio data, the seventh audio data including a fourth representation of the speech.

5. A computer-implemented method, the method comprising:
   determining first audio data that includes a first representation of audible sound output by a loudspeaker;
   determining second audio data originating from a microphone, the second audio data including a second representation of the audible sound and a first representation of speech;
   determining a first correlation value indicating a correlation between a first portion of the first audio data and a first portion of the second audio data;

determining that the first correlation value satisfies a first condition;
determining a second correlation value indicating a correlation between a second portion of the first audio data and a second portion of the second audio data;
determining that the second correlation value does not satisfy the first condition;
generating first mask data using the first correlation value and the second correlation value;
generating third audio data using the first mask data and the second audio data, the third audio data including a third representation of the audible sound; and
generating fourth audio data by subtracting the third audio data from the second audio data, the fourth audio data including a second representation of the speech.

6. The computer-implemented method of claim 5, wherein generating the third audio data further comprises:
determining that a first portion of the first mask data indicates a first value;
generating a first portion of the third audio data using the first portion of the second audio data;
determining that a second portion of the first mask data indicates a second value;
generating a second portion of the third audio data that represents silence;
determining that a third portion of the first mask data indicates the first value; and
generating a third portion of the third audio data using a third portion of the second audio data.

7. The computer-implemented method of claim 5, further comprising:
estimating steering vector data using the third audio data;
determining second mask data using an inverse function of the first mask data;
generating fifth audio data using the second mask data and the second audio data; and
generating sixth audio data using the steering vector data and the fifth audio data.

8. The computer-implemented method of claim 5, further comprising:
determining that the first correlation value does not satisfy a second condition;
setting a first value for a first portion of second mask data;
determining that the second correlation value satisfies the second condition;
setting a second value for a second portion of the second mask data; and
generating the third audio data using the first mask data, the second mask data, and the second audio data.

9. The computer-implemented method of claim 5, further comprising:
processing the fourth audio data to generate second mask data corresponding to the speech.

10. The computer-implemented method of claim 9, further comprising:
estimating first steering vector data using the third audio data, the first steering vector data corresponding to a first location associated with the loudspeaker;
generating fifth audio data using the second mask data and the fourth audio data; and
estimating second steering vector data using the fifth audio data, the second steering vector data corresponding to a second location associated with the speech.

11. The computer-implemented method of claim 5, further comprising:
receiving fifth audio data that includes a fourth representation of the audible sound, the fifth audio data being in a time domain;
sending the fifth audio data to the loudspeaker;
receiving sixth audio data from the microphone, the sixth audio data including a fifth representation of the audible sound and a third representation of the speech, the sixth audio data being in the time domain;
generating seventh audio data by modifying the fifth audio data to be time-aligned with the sixth audio data;
generating the first audio data by converting the seventh audio data from the time domain to a frequency domain; and
generating the second audio data by converting the sixth audio data from the time domain to the frequency domain.

12. A system comprising:
at least one processor; and
memory including instructions operable to be executed by the at least one processor to cause the system to:
determine first audio data that includes a first representation of audible sound output by a loudspeaker;
determine second audio data originating from a microphone, the second audio data including a second representation of the audible sound and a first representation of speech;
determine a first correlation value indicating a correlation between a first portion of the first audio data and a first portion of the second audio data;
determine that the first correlation value satisfies a first condition;
determine a second correlation value indicating a correlation between a second portion of the first audio data and a second portion of the second audio data;
determine that the second correlation value does not satisfy the first condition;
generate first mask data using the first correlation value and the second correlation value;
generate third audio data using the first mask data and the second audio data;
estimate first steering vector data using the third audio data;
determine second mask data using an inverse function of the first mask data;
generate fourth audio data using the second mask data and the second audio data; and
generate fifth audio data using the first steering vector data and the fourth audio data.

13. The system of claim 12, wherein the memory further comprises instructions that, when executed by the at least one processor, further cause the system to:
determine that a first portion of the first mask data indicates a first value;
generate a first portion of the third audio data using the first portion of the second audio data;
determine that a second portion of the first mask data indicates a second value;
generate a second portion of the third audio data that represents silence;
determine that a third portion of the first mask data indicates the first value; and
generate a third portion of the third audio data using a third portion of the second audio data.

14. The system of claim 12, wherein the memory further comprises instructions that, when executed by the at least one processor, further cause the system to:

generate sixth audio data by subtracting the fifth audio data from the second audio data, the sixth audio data including a second representation of the speech.

15. The system of claim 12, wherein the memory further comprises instructions that, when executed by the at least one processor, further cause the system to:
   determine that the first correlation value does not satisfy a second condition;
   set a first value for a first portion of the second mask data;
   determine that the second correlation value satisfies the second condition; and
   set a second value for a second portion of the second mask data.

16. The system of claim 12, wherein the memory further comprises instructions that, when executed by the at least one processor, further cause the system to:
   generate sixth audio data by subtracting the fifth audio data from the second audio data; and
   process the sixth audio data to generate third mask data corresponding to the speech.

17. The system of claim 16, wherein the memory further comprises instructions that, when executed by the at least one processor, further cause the system to:
   estimate the first steering vector data using the third audio data, the first steering vector data corresponding to a first location associated with the loudspeaker;
   generate seventh audio data using the third mask data and the sixth audio data; and
   estimate second steering vector data using the seventh audio data, the second steering vector data corresponding to a second location associated with the speech.

18. The system of claim 12, wherein the memory further comprises instructions that, when executed by the at least one processor, further cause the system to:
   receive sixth audio data that includes a third representation of the audible sound, the sixth audio data being in a time domain;
   send the sixth audio data to the loudspeaker;
   receive seventh audio data from the microphone, the seventh audio data including a fourth representation of the audible sound and a second representation of the speech, the seventh audio data being in the time domain;
   generate eighth audio data by modifying the sixth audio data to be time-aligned with the seventh audio data;
   generate the first audio data by converting the eighth audio data from the time domain to a frequency domain; and
   generate the second audio data by converting the seventh audio data from the time domain to the frequency domain.

* * * * *